(12) United States Patent
Yoshida et al.

(10) Patent No.: US 8,519,040 B2
(45) Date of Patent: Aug. 27, 2013

(54) IONIC ORGANIC COMPOUND, PRODUCTION METHOD THEREOF, HYDROGELLING AGENT COMPOSED OF THE IONIC ORGANIC COMPOUND, HYDROGEL CONTAINING SAME, METHANOL GELLING AGENT, METHANOL GEL CONTAINING SAME, AND CARBON NANOTUBE DISPERSANT

(75) Inventors: Masaru Yoshida, Ibaraki (JP);
Nagatoshi Koumura, Ibaraki (JP);
Harumi Ohyama, Ibaraki (JP);
Nobuyuki Tamaoki, Hokkaido (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 90 days.

(21) Appl. No.: 13/062,243

(22) PCT Filed: Sep. 7, 2009

(86) PCT No.: PCT/JP2009/065565
§ 371 (c)(1),
(2), (4) Date: Apr. 6, 2011

(87) PCT Pub. No.: WO2010/027067
PCT Pub. Date: Mar. 11, 2010

(65) Prior Publication Data
US 2011/0178218 A1    Jul. 21, 2011

(30) Foreign Application Priority Data

Sep. 8, 2008  (JP) .................................. 2008-229865

(51) Int. Cl.
*C08G 69/00* (2006.01)
*C08G 73/02* (2006.01)
*C08G 73/06* (2006.01)

(52) U.S. Cl.
USPC ........... 524/379; 524/389; 524/391; 524/607; 524/608; 528/332; 528/335; 528/346; 528/347; 528/422

(58) Field of Classification Search
USPC ......... 524/379, 389, 391, 607, 608; 528/332, 528/335, 346, 347, 422
See application file for complete search history.

(56) References Cited

U.S. PATENT DOCUMENTS
7,858,799 B2    12/2010    Yoshida et al.

FOREIGN PATENT DOCUMENTS
| JP | 2003-49154 A | 2/2003 |
| JP | 2003-55642 A | 2/2003 |
| JP | 2003-327949 A | 11/2003 |
| JP | 2008-248224 A | 10/2008 |
| WO | WO 2006/082768 A1 | 8/2006 |

OTHER PUBLICATIONS

Misawa, Y., et al., "Hydrogels Based on Surfactant-Free Ionene Polymers with N,N'-(p-Phenylene)dibenzamide Linkages", Macromolecules 2008, 41(22), 8841-8846.*
O'Connell, M. J. et al., "Band Gap Fluorescence from Individual Single-Walled Carbon Nanotubes", Science 2002, 297, 593-596.*
Nagasawa, J., Matsumoto, H., and Yoshida, M., "Highly Efficient and Specific Gelation of Ionic Liquids by Polymeric Electrolytes to Form Ionogels with Substantially High Gel-Sol Transition Temperatures and Rheological Properties Like Self-Standing Ability and Rapid Recovery", ACS Macro Letters 2012, 1(9), 1108-1112.*

* cited by examiner

*Primary Examiner* — Richard A Huhn

(57) ABSTRACT

Disclosed are a novel ionic organic compound and a method for producing the ionic organic compound by a simple process. Also disclosed are a hydrogelling agent composed of an ionic organic compound obtained by the method, an alcohol gelling agent, a gel which uses the gelling agent, while using water or methanol as a medium, and a carbon nanotube dispersant composed of the compound. Specifically disclosed is an ionic organic compound represented by general formula (1). The compound is obtained by a condensation reaction of (A) an aromatic diamide compound or cyclohexane diamide compound having a 4-(chloromethyl)benzamide group at both ends, and (B) a compound selected from N,N,N',N'-tetramethylalkylenediamines which may have a substituent wherein there are 1-6 carbon atoms between nitrogen atoms. The thus-obtained ionic organic compound serves as a gelling agent which is capable of gelling a neutral aqueous solution or an alcohol. The solvent solubility can be changed by substituting the anion of the thus-obtained ionic compound with another anion by anion-exchange. (In the formula, A represents a linking moiety having one or more optionally substituted aromatic rings or a linking moiety composed of a cyclohexane ring; B represents a cationic functional group having a quaternized nitrogen atom, which is selected from N,N,N', N'-tetramethylalkylenediamines which may have a substituent wherein there are 1-6 carbon atoms between nitrogen atoms; X represents a monovalent anion; and n represents an integer of 1-800.)

10 Claims, 5 Drawing Sheets

(a)

(b)

IONIC ORGANIC COMPOUND, PRODUCTION METHOD THEREOF, HYDROGELLING AGENT COMPOSED OF THE IONIC ORGANIC COMPOUND, HYDROGEL CONTAINING SAME, METHANOL GELLING AGENT, METHANOL GEL CONTAINING SAME, AND CARBON NANOTUBE DISPERSANT

TECHNICAL FIELD

The present invention relates to an ionic organic compound and a production method thereof, a hydrogelling agent composed of the subject ionic organic compound, a hydrogel containing the same, a methanol gelling agent and a methanol gel containing the same, and a carbon nanotube dispersant.

BACKGROUND ART

Gels are spread in wide fields including basic researches of their structures and physical properties and the like, application researches to food products, medical supplies, cosmetics and the like, and so on and attract attention, and the synthesis and development of novel gelling agents have been actively conducted (for example, see Patent Documents 1 to 3 below). However, there are involved problems such as difficulty in gelation under an acidic condition, requirement for multi-step synthetic process is and the like, and overcoming thereof is being desired.

On the other hand, carbon nanotubes are attracting attention as useful materials for nanotechnology. In particular, the carbon nanotubes are expected to be applied in wide range of fields such as transistors, electron emission electrodes, fuel cell electrodes, and chips for scanning microscope. When they are purified or prepared for applications as materials for the applications, it is necessary to prepare an easily handleable carbon nanotube solution or dispersed liquid. Thus, there is proposed a method for making hydrophobic carbon nanotubes soluble in a solvent, which includes adding a dispersing agent (generally an amphiphilic surfactant) to form a dispersion liquid (for example, see Non-Patent Document 1 below). Under the present circumstances, however, investigations for further improvements are still being carried out.

Under such a background, the present inventors found that a novel ionic organic oligomer having an electrolyte structure which is obtained by one step synthetic process by means of a polycondensation reaction between an aminopyridine and an acid halide having an active methylene group functions as a gelling agent against water and an acidic aqueous solution and further functions as a carbon nanotube dispersant and previously made a proposal (see Patent Document 4 below). However, in a synthesis method of the subject compound, a pyridyl site and an active methylene site each serving as a reaction site must exist in one molecule, so that syntheses of diverse ionic organic compounds are remarkably restricted.

As a result of synthetic expansion from the foregoing compound, we previously found that it is possible to synthesize ionic organic compounds by means of a copolymerization method and to utilize those ionic organic compounds as a hydrogelling agent and made an application (see Patent Document 5 below).

The present invention is concerned with synthesis of a new ionic organic compound in which the foregoing copolymerization method has been further developed and utilization of such an ionic organic compound as a hydrogelling agent and a methanol gelling agent and also as a carbon nanotube dispersant.

Citation List
Patent Document
  Patent Document 1: JP-A-2003-327949
  Patent Document 2: JP-A-2003-49154
  Patent Document 3: JP-A-2003-55642
  Patent Document 4: WO 2006/082768 A1
  Patent Document 5: Japanese Patent Application No. 2007-324701
Non-Patent Document
  Non-Patent Document 1: Science, Vol. 297, p. 593 (2002)

DISCLOSURE OF INVENTION

Technical Problem

The present invention is aimed to provide a novel ionic organic compound and a production method thereof by a simple process. Also, the present invention is aimed to provide a hydrogelling agent composed of the obtained ionic organic compound, a hydrogel using the subject hydrogelling agent and using water as a medium, a methanol gelling agent similarly composed of the obtained ionic organic compound and a methanol gel using the subject methanol gelling agent and using methanol as a medium. Furthermore, the present invention is aimed to provide a carbon nanotube dispersant composed of the subject compound.

Solution to Problem

The present invention is concerned with the synthesis of an ionic organic compound represented by the general formula (1) by allowing (A) an optionally substituted aromatic diamide compound or cyclohexane diamide compound having a 4-(chloromethyl)benzamide group at both ends thereof and (B) a compound selected from N,N,N',N'-tetramethylalkylenediamines which may have a substituent having from 1 to 6 carbon atoms between nitrogen atoms to perform a condensation reaction, and it adopts the following constitutions 1 to 8.

1. An ionic organic compound represented by the following general formula (1).

[Ka 1]

$$\left[ \underset{H_2}{\overset{}{C}} - \underset{}{\overset{}{\bigcirc}} - \underset{O}{\overset{}{\overset{\|}{C}}} - HN-A-NH - \underset{O}{\overset{}{\overset{\|}{C}}} - \underset{}{\overset{}{\bigcirc}} - \underset{H_2}{\overset{}{C}} - B \right]_n 2n(X) \quad (1)$$

(In the formula, A represents a linking site having one or more optionally substituted aromatic rings or a linking site composed of a cyclohexane ring; B represents a cationic functional group having a quaternized nitrogen atom, which is selected from N,N,N',N'-tetramethylalkylenediamines which may have a substituent having from 1 to 6 carbon atoms between nitrogen atoms; X represents a monovalent anion; and n represents an integer of from 1 to 800.)

2. A production method of the ionic organic compound as set forth in 1, which is characterized by allowing (A) an optionally substituted aromatic diamide compound or cyclohexane diamide compound having a 4-(chloromethyl)benzamide group at both ends thereof and (B) a compound selected from N,N,N',N'-tetramethylalkylenediamines which may have a substituent having from 1 to 6 carbon atoms between nitrogen atoms to perform a condensation reaction.
3. The production method as set forth in 2, which is characterized by performing the condensation reaction in dimethylformamide at from 50 to 80° C.
4. The production method of the ionic compound as set forth in 2 or 3, which is characterized by further substituting an anion of the obtained ionic compound with other anion by an anion interchange reaction.
5. A hydrogelling agent composed of the ionic organic compound as set forth in 1.
6. A hydrogel containing the hydrogelling agent as set forth in 5.
7. A methanol gelling agent composed of the ionic organic compound as set forth in 1.
8. A methanol gel containing the methanol gelling agent as set forth in 7.
9. A carbon nanotube dispersant composed of the ionic organic compound as set forth in 1.

Effect of the Invention

The ionic organic compound of the present invention is suitably used as a gelling agent of water and a gelling agent of methanol. The present invention makes it possible to efficiently produce a novel ionic compound having excellent properties as a gelling agent and the like by a simple process and opens a new road for the control of gel physical properties by a combination of reaction reagents or the synthesis and development of a functional gelling agent by means of introduction of a functional group. Also, since the ionic organic compound of the present invention is suitably used as a carbon nanotube dispersant, it is useful for the development of a novel complex material using a carbon nanotube as an element raw material.

BEST MODE FOR CARRYING OUT THE INVENTION

Figure 1:
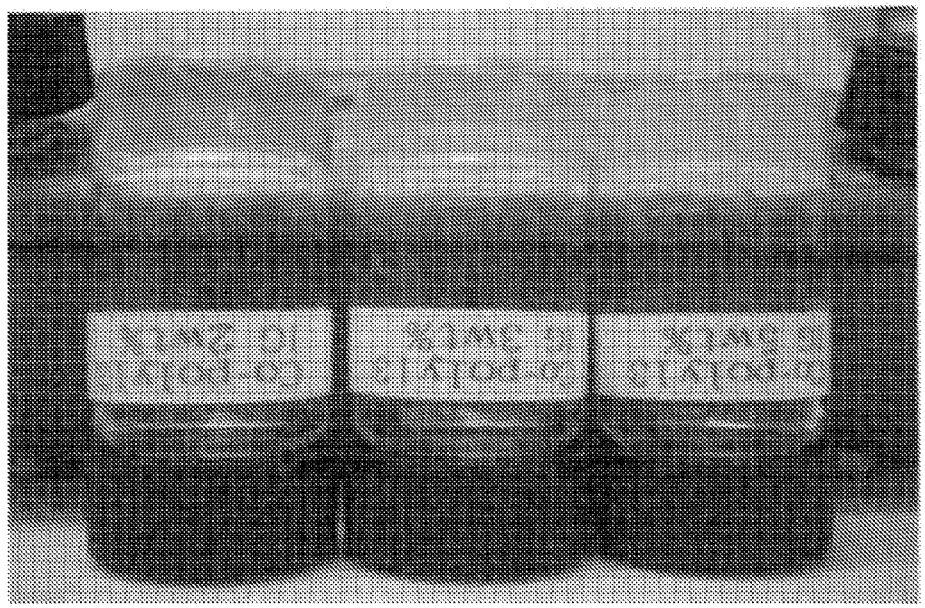
FIG. 1 is a photograph of a hydrogel obtained in Example 49, in which the concentration is 2, 3 and 5% by weight, respectively from the left.

The ionic organic compound of the present invention which is represented by the foregoing general formula (1) is obtained by a polycondensation reaction between (A) an optionally substituted aromatic diamide compound or cyclohexane diamide compound having a 4-(chloromethyl)benzamide group at both ends thereof and (B) a compound selected from N,N,N',N'-tetramethylalkylenediamines which may have a substituent having from 1 to 6 carbon atoms between nitrogen atoms and a subsequent anion interchange reaction. Though it is desirable to use a polar organic solvent such as dimethylformamide and the like as a condensation reaction solvent, it should not be construed that the condensation reaction solvent is limited thereto. Also, a reaction time is preferably from 12 to 48 hours. It is preferable that a reaction temperature is from about 50 to 80° C., especially about 80° C. A polymerization degree (n) of the ionic compound is from 1 to 800, and preferably from 10 to 300. Though it is desirable to use water as a solvent of the anion interchange reaction, it should not be construed that the solvent of the anion interchange reaction is limited thereto. Also, a reaction time is preferably from about 5 minutes to one hour. A reaction temperature is preferably from about 80 to 100° C.

Specific examples of (A) the aromatic diamide compound or cyclohexane diamide compound having a 4-(chloromethyl)benzamide group at both ends thereof include 4,4'-bis[(4-chloromethyl)benzamido]-3,3'-dimethoxybiphenyl, 1,4-bis[(4-chloromethyl)benzamido]-2,3,5,6-tetramethylbenzene, 1,4-bis[(4-chloromethyl)benzamido]-2,5-dichlorobenzene, 1,4-bis[(4-chloromethyl)benzamido]-2,5-dimethylbenzene, 1,4-bis[(4-chloromethyl)benzamido]-2-chloro-5-methylbenzene, 1,4-bis[(4-chloromethyl)benzamido]-2-methylbenzene, 4,4'-bis[{(4-chloromethyl)benzamido}phenyl]methane, 4,4'-bis[{(4-chloromethyl)benzamido}phenyl]ether, 1,5-[bis(4-chloromethyl)benzamido]naphthalene, 4,4'-bis[(4-chloromethyl)benzamido]benzanilide, α,α'-bis[(4-chloromethyl)benzamido]-1,4-diisopropylbenzene, 4,4'-bis[{(4-chloromethyl)benzamido}phenoxy]biphenyl, 4,4''-bis[(4-chloromethyl)benzamido]terphenyl, 2,7-bis[(4-chloromethyl)benzamido]fluorene, 4,4'-bis[(4-chloromethyl)benzamido]stilbene, 4,4'-bis[(4-chloromethyl)benzamido]azobenzene, 4,4'-bis[(4-chloromethyl)benzamido]-3,3'-dimethylbiphenyl, 4,4'-bis[(4-chloromethyl)benzamido]-3,3',5,5'-tetramethylbiphenyl, 4,4'-bis[(4-chloromethyl)benzamido]-3-methoxy-6-methylazobenzene and trans-1,4-bis[(4-chloromethyl)benzamido]cyclohexane.

Also, examples of the substituent of (B) the compound selected from N,N,N',N'-tetramethylalkylenediamines which may have a substituent having from 1 to 6 carbon atoms between nitrogen atoms include alkyl groups having from about 1 to 6 carbon atoms such as methyl, ethyl and propyl groups and the like; and alkoxy groups having from about 1 to 6 carbon atoms such as methoxy, ethoxy and propoxy groups and the like.

Specific examples of such a compound include N,N,N',N'-tetramethyldiaminomethane, N,N,N',N'-tetramethylethylenediamine, N,N,N',N'-tetramethyl-1,3-propylenediamine, N,N,N',N'-tetramethyl-1,4-butylenediamine, N,N,N',N'-tetramethyl-1,6-hexylenediamine, N,N,N',N'-tetramethyl-1,4-diamino-2-butene, (R,R)-(−)-2,3-dimethoxy-1,4-bis(dimethylamino)butane, (S,S)-(+)-2,3-dimethoxy-1,4-bis(dimethylamino)butane, 1,4-diazabicyclo[2,2,2]octane and the like.

As the preferred ionic organic compound represented by the foregoing general formula (1), compounds represented by the following general formula (A1) are enumerated as examples.

[Ka 2]

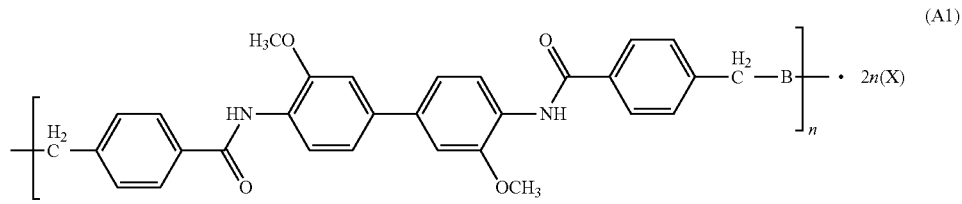

(In the formula, B represents a cationic functional group having a quaternized nitrogen atom of N,N,N',N'-tetramethylethylenediamine, N,N,N',N'-tetramethyl-1,3-propylenediamine, N,N,N',N'-tetramethyl-1,4-butylenediamine or N,N,N',N'-tetramethyl-1,6-hexylenediamine; X represents at least one members selected from a halogen ion (F, Cl, Br or I), a bis(trifluoromethanesulfonyl) amide group (TFSA), a tetrafluoroborate group ($BF_4$), a hexafluorophosphate group ($PF_6$), thiocyanate (SCN), a nitrate group ($NO_3$), a sulfate group ($SO_4$), a thiosulfate group ($S_2O_3$), a carbonate group ($CO_3$), a hydrogencarbonate group ($HCO_3$), a phosphate group, a phosphite group, a hypophosphite group, any halogen oxide acid group ($XO_4$, $XO_3$, $XO_2$ or XO, wherein X is Cl, Br or I), a tris(trifluoromethylsulfonyl) carbon acid group, a trifluoromethylsulfonate group, a dicyanamide group, an acetate group ($CH_3COO$), a haloacetate group (($CX_nH_{3-n}$)COO, wherein X is F, Cl, Br or I, and n is 1, 2 or 3) and a tetraphenylborate group ($BPh_4$) and a derivative thereof ($B(Aryl)_4$, wherein Aryl is a substituted phenyl group); and n represents an integer of from 1 to 800.)

Other representative examples of compounds (A2 to A20) are also shown below.

TABLE 1

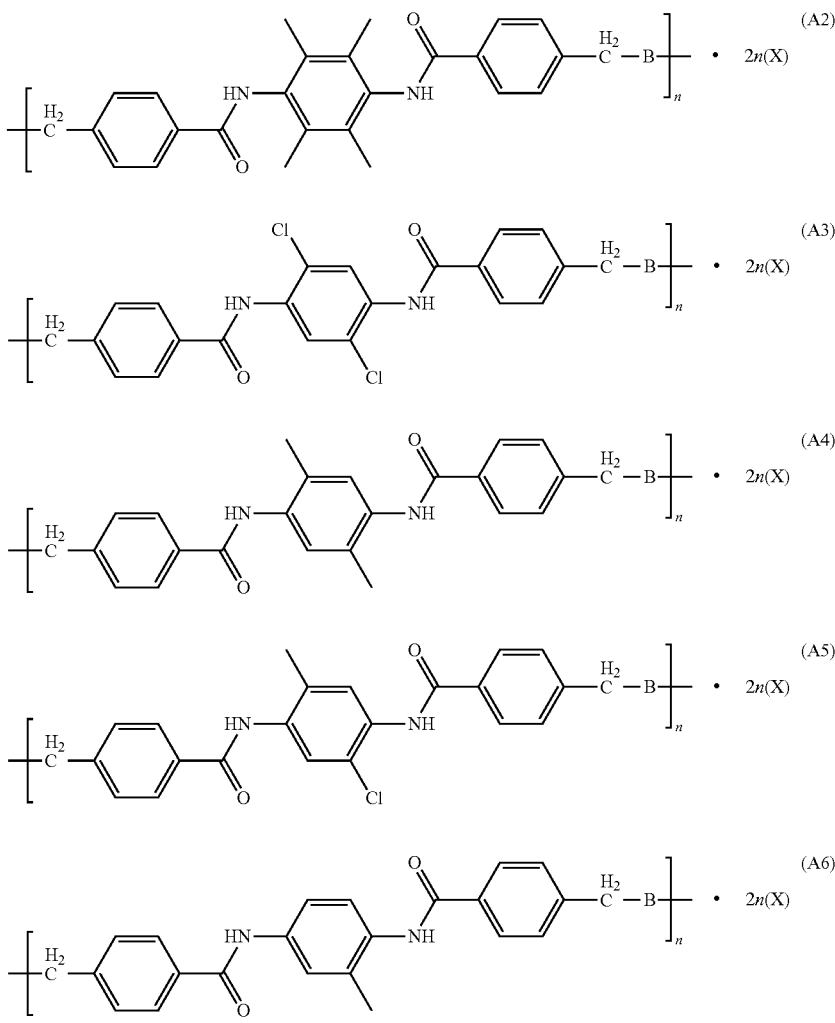

TABLE 2
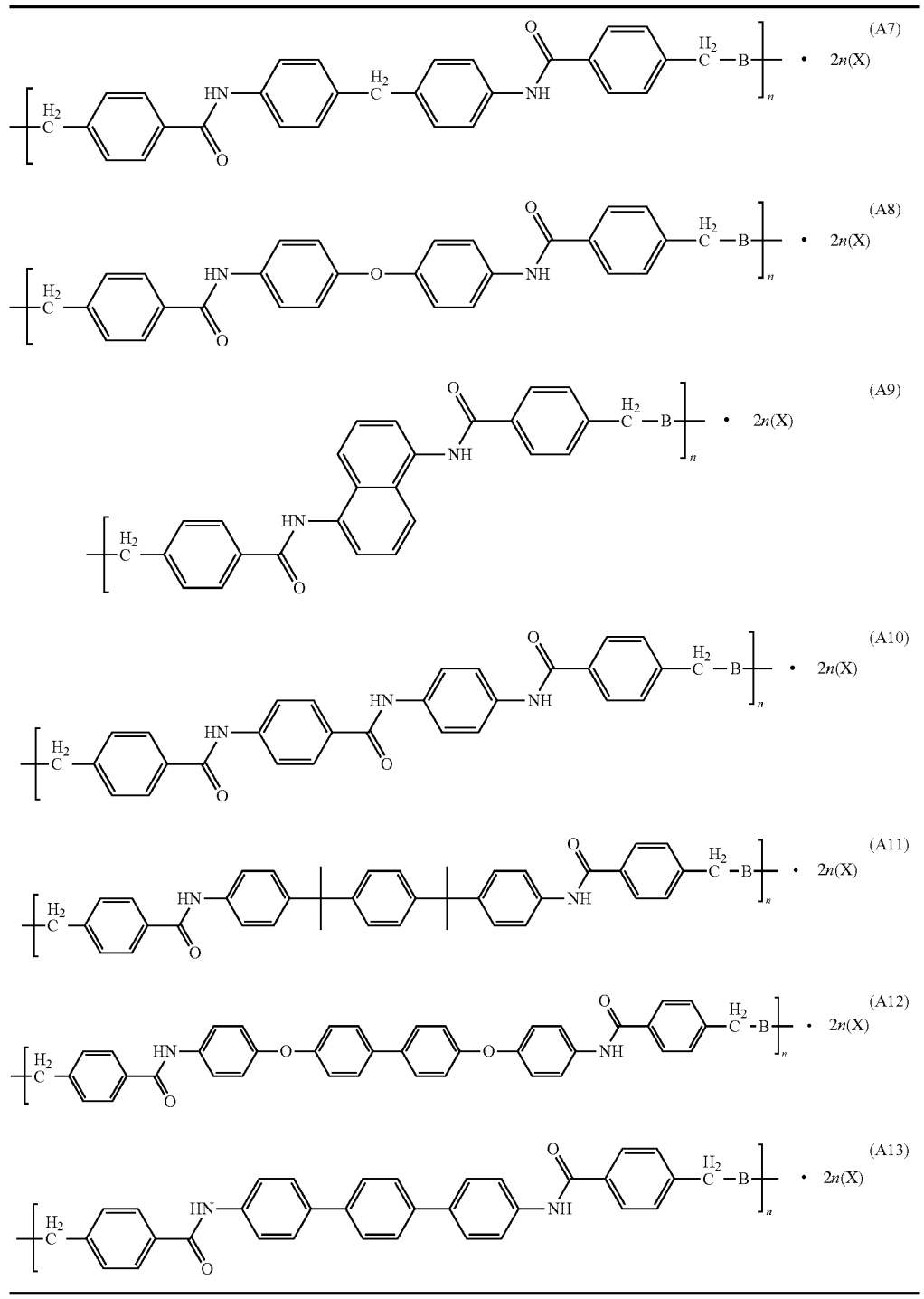
TABLE 3
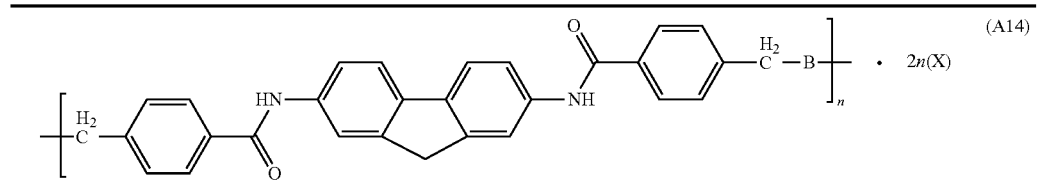

TABLE 3-continued
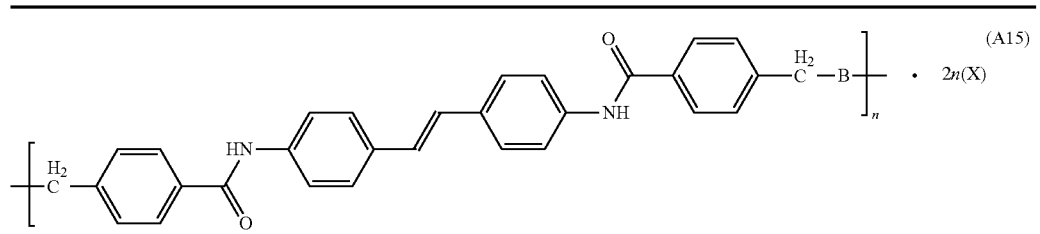
(A15)
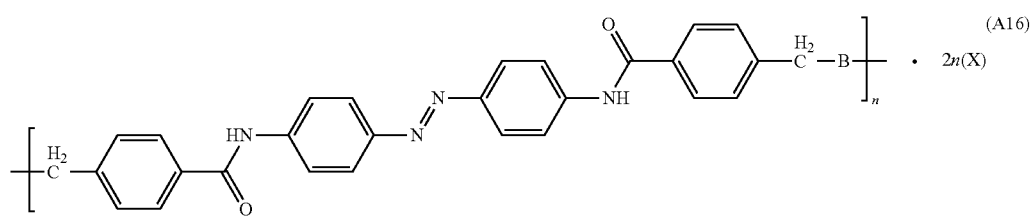
(A16)
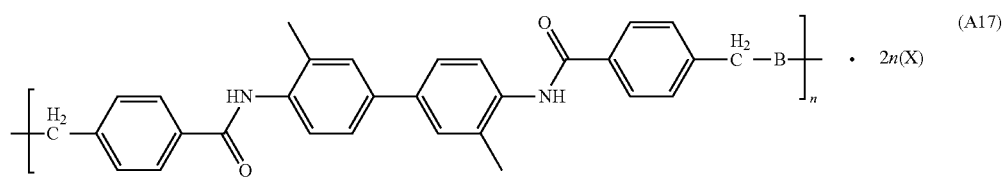
(A17)
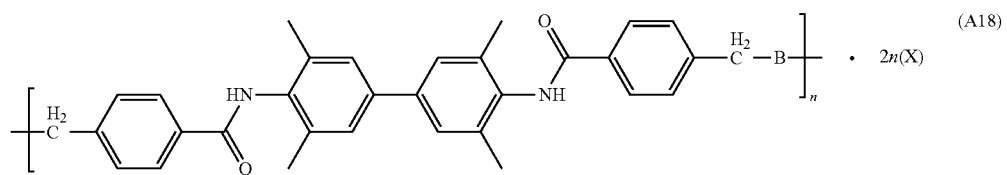
(A18)
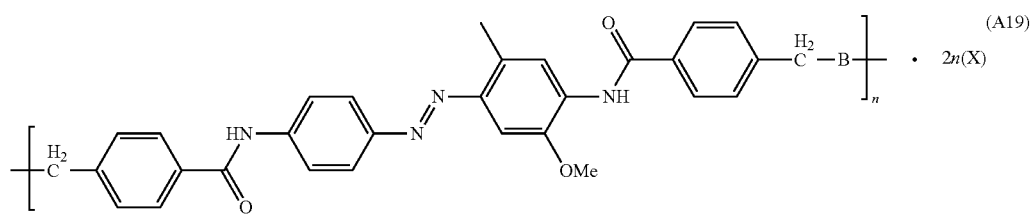
(A19)
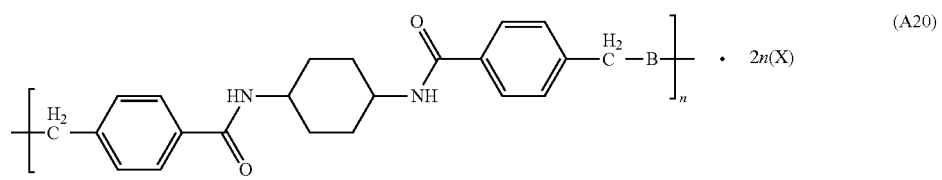
(A20)

The ionic organic compound obtained by the foregoing method, which is represented by the general formula (1), has excellent properties as a hydrogelling agent, and a hydrogel is obtained by dissolving the subject compound in neutral water under heating and then allowing it to stand at room temperature. Similarly, a methanol gel is obtained by dissolving the subject compound in methanol under heating and then allowing it to stand at room temperature.

In such compounds, it may be considered that the ionic quaternized nitrogen atom is responsible for solubility in water, and the amide group (hydrogen bond), the aromatic ring or hydrocarbon site (hydrophobic interaction), the mutual charge between the cation moiety and the anion moiety (electrostatic interaction) or the like is responsible for an intermolecular interaction, whereby an organization is formed to cause a gelling phenomenon.

EXAMPLES

The present invention is hereunder specifically described by reference to the following Examples, but it should not be construed that the present invention is limited to the following specific examples.

In the following Examples that is a raw material to produce the ionic organic compound, as for 4-(chloromethyl)benzoyl chloride, N,N,N',N'-tetramethylethylenediamine, N,N,N',N'-tetramethyl-1,3-diaminopropane, N,N,N',N'-tetramethyl-1,4-diaminobutane, N,N,N',N'-tetramethyl-1,6-diaminohexane, 4,4'-diamino-3,3'-dimethoxybiphenyl (o-dianisidine), 1,4-diamino-2,3,5,6-tetramethylbenzene, 1,4-diamino-2,5-dichlorobenzene, 1,4-diamino-2,5-dimethylbenzene, 1,4-diamino-2-chloro-5-methylbenzene, 2,5-diaminotoluene dihydrochloride, bis(4-aminophenyl)methane, bis(4-aminophenyl)ether, 1,5-diaminonaphthalene, 4,4'-diaminobenzanilide, α,α'-bis(diaminophenyl)-1,4-diisopropylbenzene, 4,4'-bis(4-aminophenyl)biphenyl, 4,4''-diaminoterphenyl, 2,7-diaminofluorene, 4,4'-diaminostilbene dihydrochloride, o-toluidine, 3,3',5,5'-tetramethylbenzidine, 4,4'-diamino-3-methoxy-6-methylazobenzene (Disperse Diazo Black-3BF), ammonium hexafluorophosphate, ammonium tetrafluoroborate, lithium perchlorate and sodium thiocyanate, those purchased from Tokyo Chemical Industry Co., Ltd. were used as they were. As for dehydrated methylene chloride and N,N-dimethylformamide, those purchased from Kanto Chemical Co., Inc. were used as they were. As for triethylamine, p-phenylenediamine and N,N,N',N'-tetramethylethylenediamine, those purchased from Wako Pure Chemical Industries, Ltd. were used as they were. As for 4,4'-azodianiline, one purchased from Akcros Chemicals was used as it was. As for lithium bis(trifluoromethanesulfonyl)imide, one purchased from Kishida Chemical Co., Ltd. was used as it was.

Production Example 1

Synthesis of 4,4'-bis[(4-chloromethyl)benzamido]-3,3'-dimethoxybiphenyl 4,4'-Diamino-3,3'-dimethoxybiphenyl (o-dianisidine) (2.44 g, 10.0 mmoles) and trimethylamine (2.23 g, 22.0 mmoles) were dissolved in dehydrated methylene chloride (90 mL). A solution of 4-chloromethylbenzoyl chloride (3.78 g, 20.0 mmoles) in dehydrated methylene chloride (60 mL) was added thereto with stirring over one hour. Thereafter, the mixture was refluxed under heating for 4 hours and then stirred at room temperature for 13 hours. A precipitate was separated by filtration to obtain a titled compound represented by the following formula (2) as a yellow powder. Yield: 4.69 g, percent yield: 85%. $^1$H-NMR (300 MHz, DMSO-$d_6$) δ 3.97 (s, 6H), 4.86 (s, 4H), 7.33 (dd, J=2 Hz, 8 Hz, 2H), 7.39 (d, J=2 Hz, 2H), 7.60 (d, J=8 Hz, 4H), 7.90 (d, J=8 Hz, 2H), 7.99 (d, J=8 Hz, 4H), 9.53 (s, 2H).

[Ka 3]

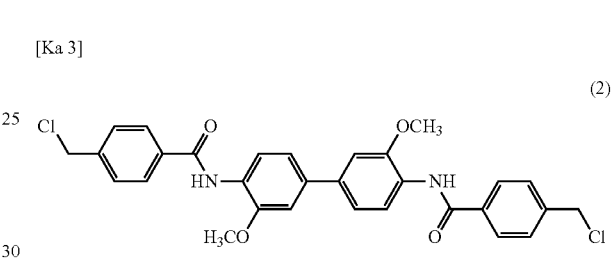

(2)

Example 1

4,4'-Bis[(4-chloromethyl)benzamido]-3,3'-dimethoxybiphenyl (1.10 g, 2.0 mmoles) obtained in the foregoing Production Example 1 and N,N,N',N'-tetramethyl-1,6-diaminohexane (0.345 g, 2.0 mmoles) were stirred in dimethylformamide (80 mL) under heating at 80° C. for 48 hours. A precipitate which had been formed by the progress of a quaternization reaction was separated by filtration to obtain an ionic organic compound represented by the following formula (3) in a percent yield of 66%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $1.91 \times 10^4$, a weight average molecular weight ($M_w$) of $7.96 \times 10^4$ and a degree of dispersion of molecular weight distribution ($M_w/M_n$) of 4.2.

[Ka 4]

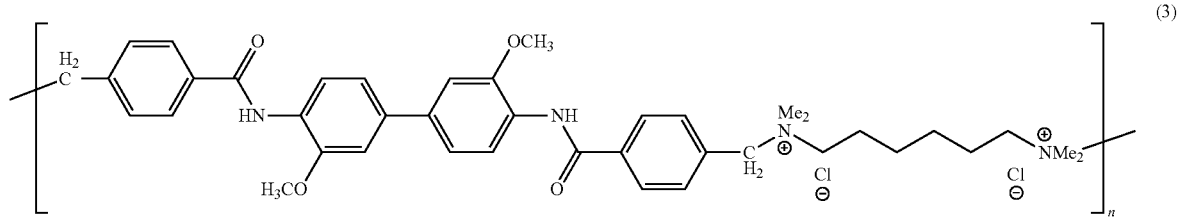

(3)

Example 2

A compound represented by the following formula (4) was obtained in a percent yield of 51% in the same manner as in Example 1, except that in the foregoing Example 1, N,N,N',N'-tetramethyl-1,3-diaminopropane was used in place of the N,N,N',N'-tetramethyl-1,6-diaminohexane. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $1.41 \times 10^5$, a weight average molecular weight ($M_w$) of $2.05 \times 10^5$ and a degree of dispersion of molecular weight distribution ($M_w/M_n$) of 1.5.

zene was used in place of the 4,4'-diamino-3,3'-dimethoxybiphenyl (o-dianisidine) in the foregoing Production Example 1. Percent yield: 87%. $^1$H-NMR (300 MHz, DMSO-$d_6$) δ 2.11 (s, 12H), 4.86 (s, 4H), 7.60 (d, J=8 Hz, 4H), 8.03 (d, J=8 Hz, 4H), 9.89 (s, 2H).

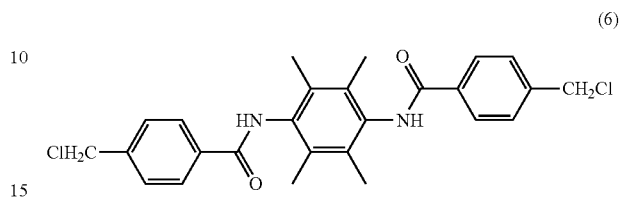

(6)

[Ka 5]

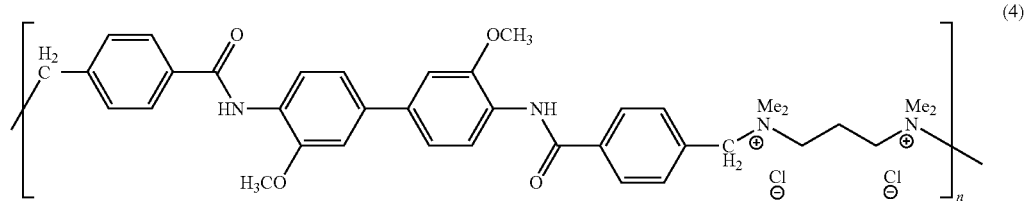

(4)

Example 3

A compound represented by the following formula (5) was obtained in the same manner as in Example 1, except that in the foregoing Example 1, N,N,N',N'-tetramethylethylenediamine was used in place of the N,N,N',N'-tetramethyl-1,6-diaminohexane. Percent yield: 25%. The product was a compound which is sparingly soluble in a solvent.

Example 4

An ionic organic compound represented by the following formula (7) was obtained in a percent yield of 96% in the same manner as in Example 1, except that in the foregoing Example 1, 1,4-bis[(4-chloromethyl)benzamido]-2,3,5,6-tetramethylbenzene was used in place of the 4,4'-bis[(4-chloromethyl)benzamido]-3,3'-dimethoxybiphenyl. A structure of the

[Ka 6]

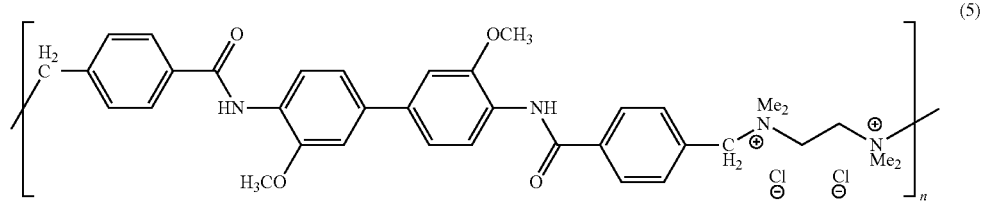

(5)

Production Example 2

Synthesis of 1,4-bis[(4-chloromethyl)benzamido]-2,3,5,6-tetramethylbenzene

A titled compound represented by the following formula (6) was obtained in the same manner as in Production Example 1, except that 1,4-diamino-2,3,5,6-tetramethylbenobtained compound was confirmed by a $^1$H NMR spectrum of the compound. $^1$H-NMR (300 MHz, D$_2$O) δ 1.54 (br, 4H), 2.01 (br, 4H), 2.27 (br, 12H), 3.16 (br, 12H), 3.43 (br, 4H), 4.66 (be, 4H), 4.82 (br, 8H), 7.80 (br, 4H), 8.14 (br, 4H). In the molecular weight distribution determined from the measurement of size exclusion chromatography of a TFSA derivative as described later, a cation principal chain moiety was estimated to have a number average molecular weight ($M_n$) of $1.24 \times 10^4$, a weight average molecular weight ($M_w$) of $5.85 \times 10^4$ and a degree of dispersion of molecular weight distribution ($M_w/M_n$) of 4.7.

[Ka 8]

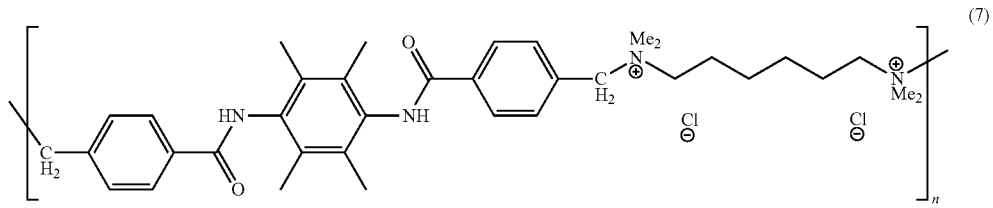

(7)

Production Example 3

Synthesis of 1,4-bis[(4-chloromethyl)benzamido]-2,5-dichlorobenzene

A titled compound represented by the following formula (8) was obtained in the same manner as in Production Example 1, except that 1,4-diamino-2,5-dichlorobenzene was used in place of the 4,4'-diamino-3,3'-dimethoxybiphenyl (o-dianisidine) in the foregoing Production Example 1. Percent yield: 99%. This compound was a compound which is sparingly soluble in a solvent.

[Ka 9]

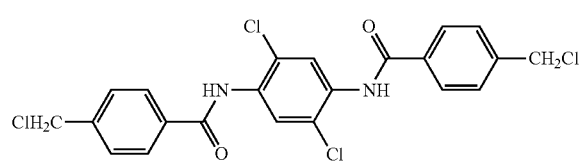

(8)

Example 5

An ionic organic compound represented by the following formula (9) was obtained in a percent yield of 79% in the same manner as in Example 1, except that in the foregoing Example 1, 1,4-bis[(4-chloromethyl)benzamido]-2,5-dichlorobenzene was used in place of the 4,4'-bis[(4-chloromethyl)benzamido]-3,3'-dimethoxybiphenyl. The progress of the quaternization reaction and structure were confirmed by a $^1$H-NMR spectrum of a TFSA derivative as described later.

Furthermore, in the molecular weight distribution determined from the measurement of size exclusion chromatography of the TFSA derivative, a cation principal chain moiety was estimated to have a number average molecular weight ($M_n$) of $1.27 \times 10^4$, a weight average molecular weight ($M_w$) of $4.20 \times 10^4$ and a degree of dispersion of molecular weight distribution ($M_w/M_n$) of 3.3.

[Ka 10]

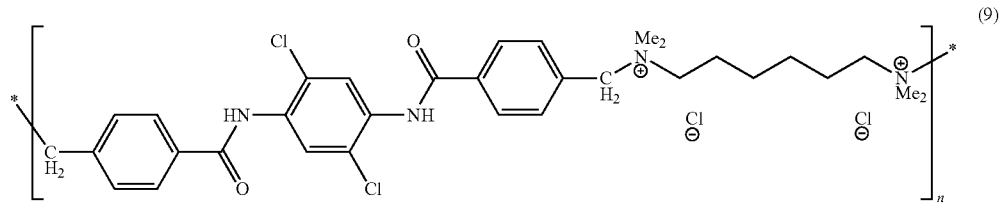

(9)

Production Example 4

Synthesis of 1,4-bis[(4-chloromethyl)benzamido]-2,5-dimethylbenzene

A titled compound represented by the following formula (10) was obtained in the same manner as in Production Example 1, except that 1,4-diamino-2,5-dimethylbenzene was used in place of the 4,4'-diamino-3,3'-dimethoxybiphenyl (o-dianisidine) in the foregoing Production Example 1. Percent yield: 96%. $^1$H-NMR (300 MHz, DMSO-$d_6$) δ 2.20 (s, 6H), 4.84 (s, 4H), 7.24 (s, 2H), 7.59 (d, J=8 Hz, 4H), 7.99 (d, J=8 Hz, 4H), 9.89 (s, 2H).

[Ka 11]

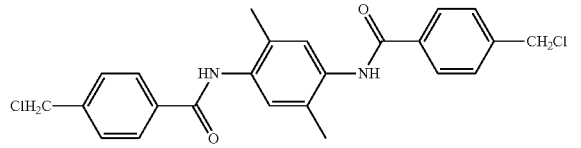

(10)

Example 6

An ionic organic compound represented by the following formula (11) was obtained in a percent yield of 77% in the same manner as in Example 1, except that in the foregoing Example 1, 1,4-bis[(4-chloromethyl)benzamido]-2,5-dimethylbenzene was used in place of the 4,4'-bis[(4-chloromethyl)benzamido]-3,3'-dimethoxybiphenyl. A structure of the obtained compound was confirmed by a proton NMR spectrum of the compound. $^1$H-NMR (300 MHz, D$_2$O) δ 1.53 (br, 4H), 1.98 (br, 4H), 2.17 (br, 6H), 3.13 (br, 14H), 3.40 (br, 4H), 4.65 (br, 4H), 7.36 (br, 2H), 7.77 (br, 4H), 8.08 (br, 4H). In the molecular weight distribution determined from the measurement of size exclusion chromatography of a TFSA derivative as described later, a cation principal chain moiety was estimated to have a number average molecular weight (M$_n$) of 1.82×10$^4$, a weight average molecular weight (M$_w$) of 1.05×10$^5$ and a degree of dispersion of molecular weight distribution (M$_w$/M$_n$) of 5.8.

[Ka 12]

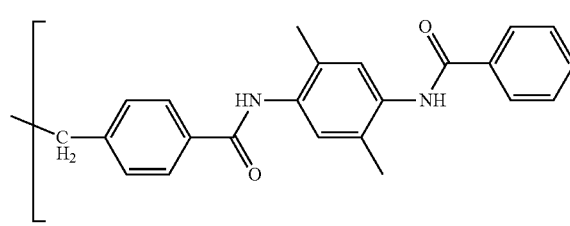

Production Example 5

Synthesis of 1,4-bis[(4-chloromethyl)benzamido]-2-chloro-5-methylbenzene

A titled compound represented by the following formula (12) was obtained in the same manner as in Production Example 1, except that 1,4-diamino-2-chloro-5-methylbenzene was used in place of the 4,4'-diamino-3,3'-dimethoxybiphenyl (o-dianisidine) in the foregoing Production Example 1. Percent yield: 99%. $^1$H-NMR (300 MHz, DMSO-d$_6$) δ 2.26 (s, 3H), 4.85 (s, 4H), 7.49 (s, 1H), 7.55-7.62 (m, 5H), 7.99 (d, J=8 Hz, 2H) 8.002 (d, J=8 Hz, 2H), 10.00 (s, 1H), 10.10 (s, 1H).

[Ka 13]

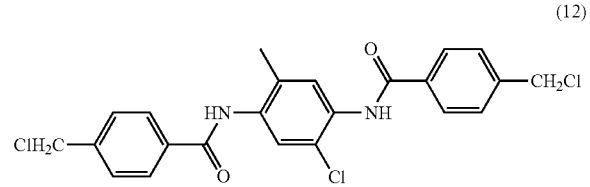

(12)

Example 7

An ionic organic compound represented by the following formula (13) was obtained in a percent yield of 92% in the same manner as in Example 1, except that in the foregoing Example 1, 1,4-bis[(4-chloromethyl)benzamido]-2-chloro-5-methylbenzene was used in place of the 4,4'-bis[(4-chloromethyl)benzamido]-3,3'-dimethoxybiphenyl. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight (M$_n$) of 2.45×10$^4$, a weight average molecular weight (M$_w$) of 5.06×10$^4$ and a degree of dispersion of molecular weight distribution (M$_w$/M$_n$) of 2.1.

[Ka 14]

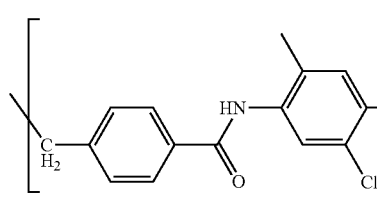

Production Example 6

Synthesis of 1,4-bis[(4-chloromethyl)benzamido]-2-methylbenzene

A titled compound represented by the following formula (14) was obtained in the same manner as in Production Example 1, except that 2,5-diaminotoluene dihydrochloride was used in place of the 4,4'-diamino-3,3'-dimethoxybiphenyl (o-dianisidine) in the foregoing Production Example 1. Percent yield: 93%. $^1$H-NMR (300 MHz, DMSO-d$_6$) δ 2.24 (s, 3H), 4.85 (s, 4H), 7.30 (d, J=8 Hz, 1H), 7.58-7.69 (m, 6H), 7.97 (m, 4H), 9.88 (s, 1H), 10.25 (s, 1H).

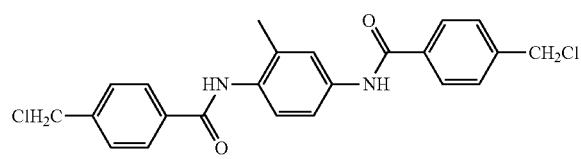

(14)

Example 8

An ionic organic compound represented by the following formula (15) was obtained in a percent yield of 100% in the same manner as in Example 1, except that in the foregoing Example 1, 1,4-bis[(4-chloromethyl)benzamido]-2-methylbenzene was used in place of the 4,4'-bis[(4-chloromethyl)benzamido]-3,3'-dimethoxybiphenyl. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $5.92 \times 10^4$, a weight average molecular weight ($M_w$) of $1.66 \times 10^5$ and a degree of dispersion of molecular weight distribution ($M_w/M_n$) of 2.8.

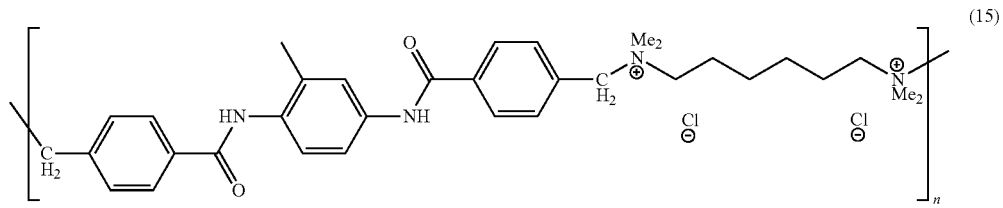

(15)

Production Example 7

Synthesis of 4,4'-bis[{(4-chloromethyl)benzamido}phenyl]methane

A titled compound represented by the following formula (16) was obtained in the same manner as in Production Example 1, except that bis(4-aminophenyl)methane was used in place of the 4,4'-diamino-3,3'-dimethoxybiphenyl (o-dianisidine) in the foregoing Production Example 1. Percent yield: 98%. $^1$H-NMR (300 MHz, DMSO-$d_6$) δ 3.90 (s, 2H), 4.84 (s, 4H), 7.20 (d, J=8 Hz, 4H), 7.58 (d, J=8 Hz, 4H), 7.68 (d, J=8 Hz, 4H), 7.94 (d, J=8 Hz, 4H), 10.21 (s, 2H).

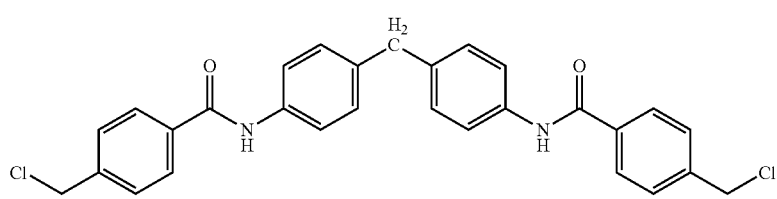

(16)

Example 9

An ionic organic compound represented by the following formula (17) was obtained in a percent yield of 85% in the same manner as in Example 1, except that in the foregoing Example 1, 4,4'-bis[{(4-chloromethyl)benzamido}phenyl]methane was used in place of the 4,4'-bis[(4-chloromethyl)benzamido]-3,3'-dimethoxybiphenyl. The obtained compound was one which is sparingly soluble in a solvent.

[Ka 18]

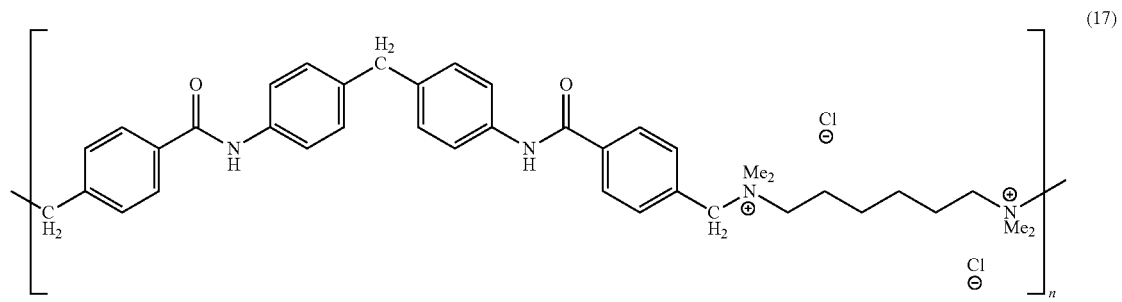

(17)

Production Example 8

Synthesis of 4,4'-bis[{(4-chloromethyl)benzamido}phenyl]ether

A titled compound represented by the following formula (18) was obtained in the same manner as in Production Example 1, except that bis(4-aminophenyl)ether was used in place of the 4,4'-diamino-3,3'-dimethoxybiphenyl (o-dianisidine) in the foregoing Production Example 1. Percent yield: 96%. $^1$H-NMR (300 MHz, DMSO-$d_6$) δ 4.85 (s, 4H), 7.02 (d, J=9 Hz 4H), 7.59 (d, J=8 Hz, 4H), 7.78 (d, J=9 Hz, 4H), 7.96 (d, J=8 Hz, 4H), 10.29 (s, 2H).

[Ka 19]

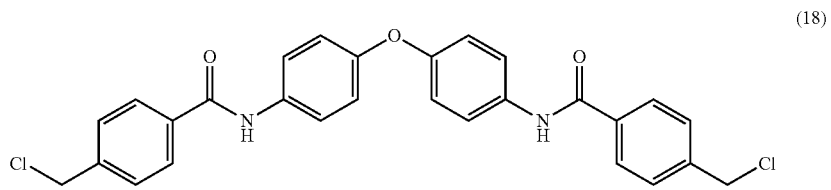

(18)

Example 10

An ionic organic compound represented by the following formula (19) was obtained in a percent yield of 75% in the same manner as in Example 1, except that in the foregoing Example 1, 4,4'-bis[{(4-chloromethyl)benzamido}phenyl]ether was used in place of the 4,4'-bis[(4-chloromethyl)benzamido]-3,3'-dimethoxybiphenyl. The product was a compound which is sparingly soluble in a solvent.

[Ka 20]

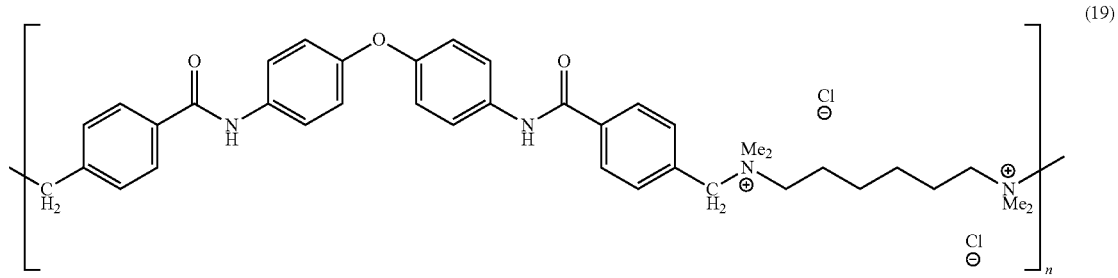

(19)

Production Example 9

Synthesis of 1,5-[bis(4-chloromethyl)benzamido]naphthalene

A titled compound represented by the following formula (20) was obtained in the same manner as in Production Example 1, except that 1,5-diaminonaphthalene was used in place of the 4,4'-diamino-3,3'-dimethoxybiphenyl (o-dianisidine) in the foregoing Production Example 1. Percent yield: 94%. $^1$H-NMR (300 MHz, DMSO-$d_6$) δ 4.88 (s, 4H), 7.55-7.65 (m, 8H), 7.95 (d, J=8 Hz, 2H), 8.11 (d, J=8 Hz, 4H), 10.52 (s, 2H).

[Ka 21]

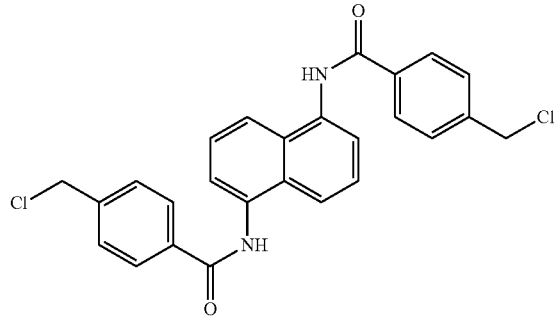

(20)

Example 11

An ionic organic compound represented by the following formula (21) was obtained in the same manner as in Example 1, except that in the foregoing Example 1, 1,5-[bis(4-chloromethyl)benzamido]naphthalene was used in place of the 4,4'-bis[(4-chloromethyl)benzamido]-3,3'-dimethoxybiphenyl. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $1.75 \times 10^4$, a weight average molecular weight ($M_w$) of $8.01 \times 10^4$ and a degree of dispersion of molecular weight distribution ($M_w/M_n$) of 4.6.

[Ka 22]

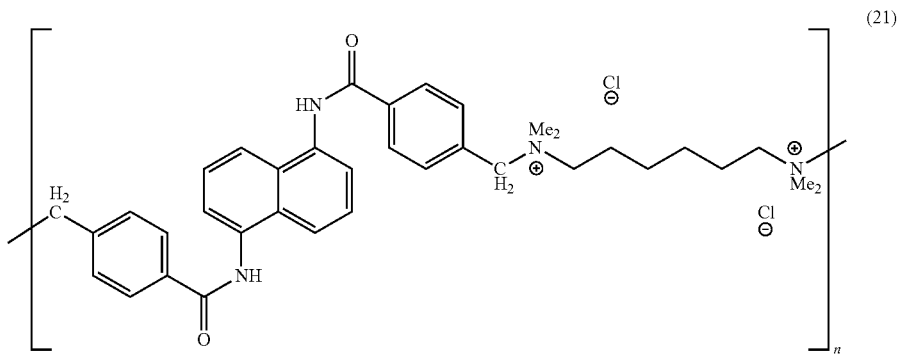

(21)

Production Example 10

Synthesis of 4,4'-[bis(4-chloromethyl)benzamido]benzanilide

A titled compound represented by the following formula (22) was obtained in the same manner as in Production Example 1, except that 4,4'-diaminobenzanilide was used in place of the 4,4'-diamino-3,3'-dimethoxybiphenyl (o-dianisidine) in the foregoing Production Example 1. Percent yield: 96%. The product was a compound which is sparingly soluble in a solvent.

[Ka 23]

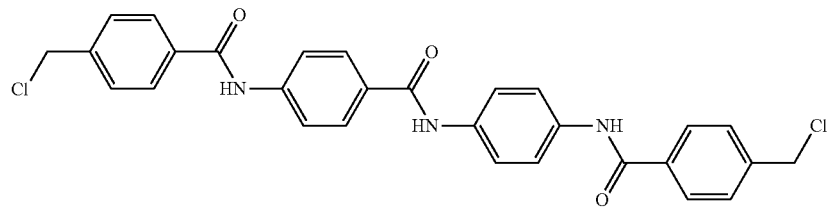

(22)

Example 12

An ionic organic compound represented by the following formula (23) was obtained in the same manner as in Example 1, except that in the foregoing Example 1, 4,4'-[bis(4-chloromethyl)benzamido]benzanilide was used in place of the 4,4'-bis[(4-chloromethyl)benzamido]-3,3'-dimethoxybiphenyl. Percent yield: 92%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 24]

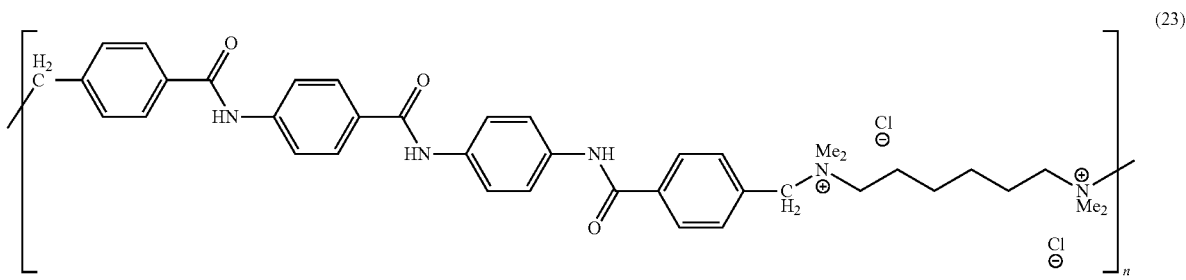

(23)

Example 13

An ionic organic compound represented by the following formula (24) was obtained in a percent yield of 100% in the same manner as in Example 1, except that in the foregoing Example 12, N,N,N',N'-tetramethyl-1,4-diaminobutane was used in place of the N,N,N',N'-tetramethyl-1,6-diaminohexane. The product was a compound which is sparingly soluble in a solvent.

[Ka 25]

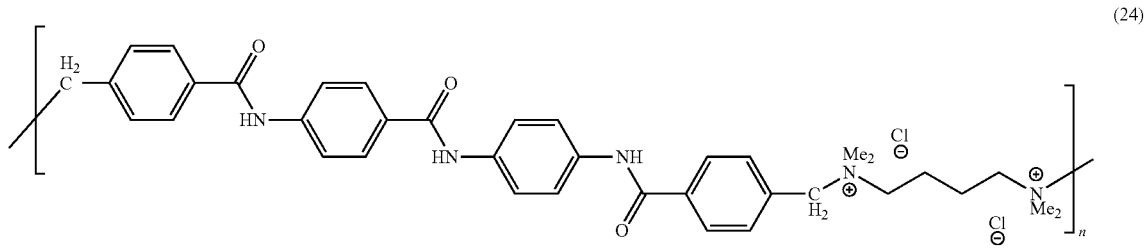

(24)

Example 14

An ionic organic compound represented by the following formula (25) was obtained in a percent yield of 100% in the same manner as in Example 1, except that in the foregoing Example 12, N,N,N',N'-tetramethyl-1,3-diaminopropane was used in place of the N,N,N',N'-tetramethyl-1,6-diaminohexane. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $2.20 \times 10^4$, a weight average molecular weight ($M_w$) of $5.11 \times 10^4$ and a degree of dispersion of molecular weight distribution ($M_w/M_n$) of 2.3.

[Ka 26]

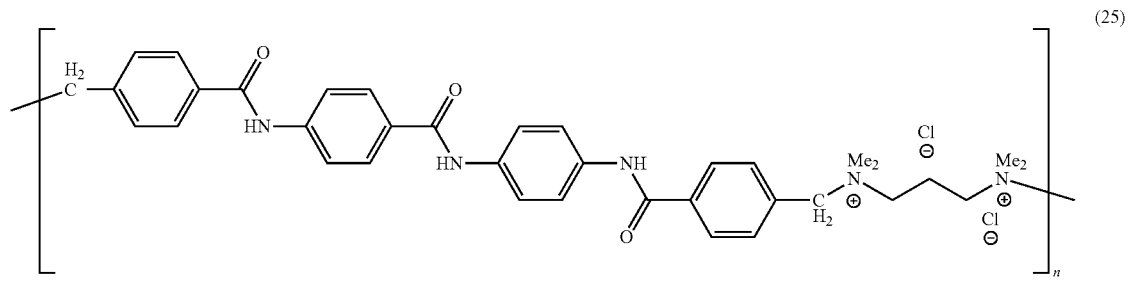

(25)

Example 15

An ionic organic compound represented by the following formula (26) was obtained in a percent yield of 71% in the same manner as in Example 1, except that in the foregoing Example 12, N,N,N',N'-tetramethylethylenediamine was used in place of the N,N,N',N'-tetramethyl-1,6-diaminohexane. The product was a compound which is sparingly soluble in a solvent.

[Ka 27]

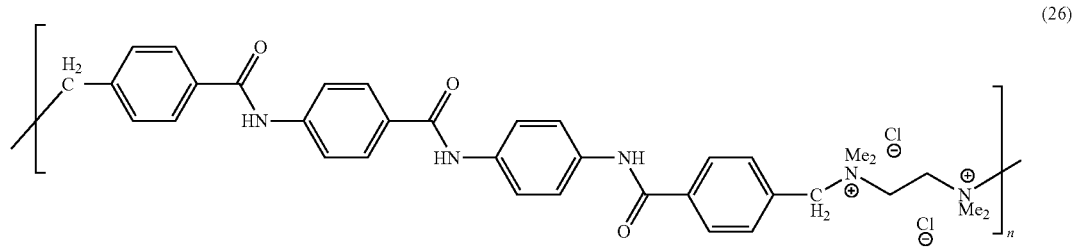

(26)

Production Example 11

Synthesis of α,α'-bis[(4-chloromethyl)benzamido]-1,4-diisopropylbenzene

A titled compound represented by the following formula (27) was obtained in the same manner as in Production Example 1, except that α,α'-bis(diaminophenyl)-1,4-diisopropylbenzene was used in place of the 4,4'-diamino-3,3'-dimethoxybiphenyl (o-dianisidine) in the foregoing Production Example 1. Percent yield: 90%. $^1$H-NMR (300 MHz, DMSO-$d_6$) δ 1.62 (s, 12H), 4.84 (s, 4H), 7.13 (s, 4H), 7.20 (d, J=9 Hz, 4H), 7.58 (d, J=9 Hz, 4H), 7.65 (d, J=8 Hz, 4H), 7.94 (d, J=8 Hz, 4H), 10.20 (s, 2H).

[Ka 28]

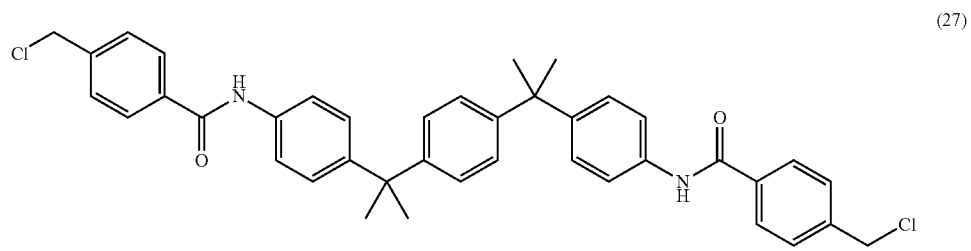

(27)

Example 16

An ionic organic compound represented by the following formula (28) was obtained in the same manner as in Example 1, except that in the foregoing Example 1, α,α'-bis[(4-chloromethyl)benzamido]-1,4-diisopropylbenzene was used in place of the 4,4'-bis[(4-chloromethyl)benzamido]-3,3'-dimethoxybiphenyl. Percent yield: 81%. The product was a compound which is sparingly soluble in a solvent.

[Ka 29]

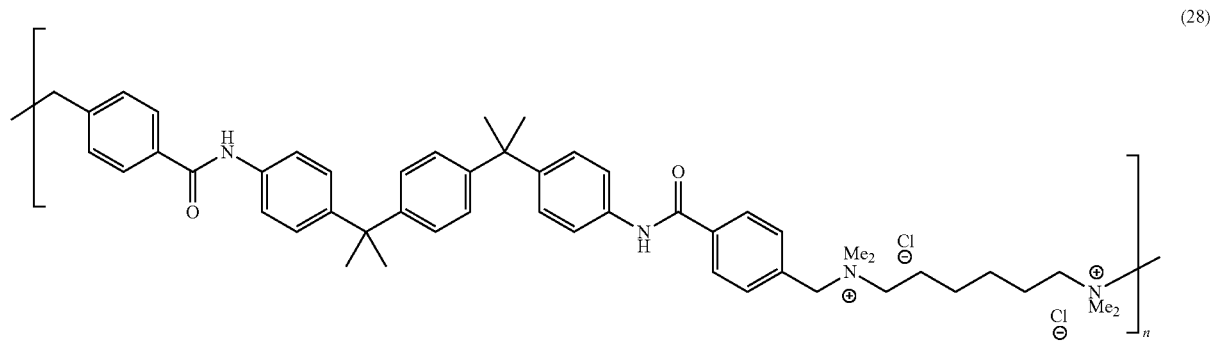

(28)

Production Example 12)

Synthesis of 4,4'-bis[{(4-chloromethyl)benzamido}phenoxy]biphenyl

A titled compound represented by the following formula (29) was obtained in the same manner as in Production Example 1, except that 4,4'-bis(4-aminophenoxy)biphenyl was used in place of the 4,4'-diamino-3,3'-dimethoxybiphenyl (o-dianisidine) in the foregoing Production Example 1. Percent yield: 98%. The product was a compound which is sparingly soluble in a solvent.

[Ka 30]

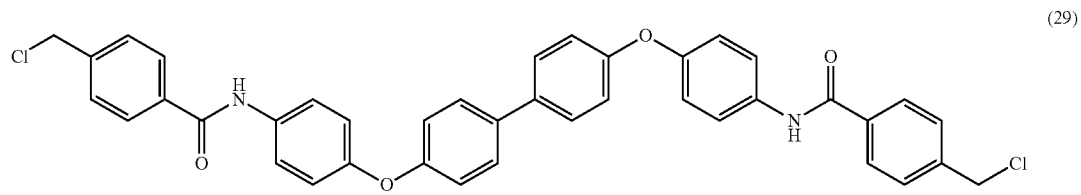

(29)

Example 17

An ionic organic compound represented by the following formula (30) was obtained in the same manner as in Example 1, except that in the foregoing Example 1, 4,4'-bis[{(4-chloromethyl)benzamido}phenoxy]biphenyl was used in place of the 4,4'-bis[(4-chloromethyl)benzamido]-3,3'-dimethoxybiphenyl. Percent yield: 85%. The product was a compound which is sparingly soluble in a solvent.

[Ka 31]

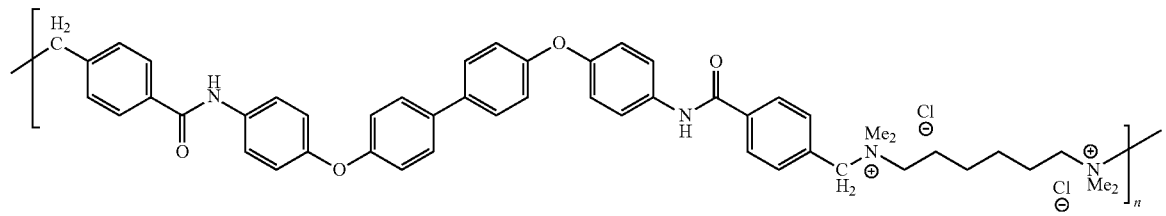

(30)

Production Example 13

Synthesis of 4,4''-bis[(4-chloromethyl)benzamido]terphenyl

A titled compound represented by the following formula (31) was obtained in the same manner as in Production Example 1, except that 4,4''-diaminoterphenyl was used in place of the 4,4'-diamino-3,3'-dimethoxybiphenyl (o-dianisidine) in the foregoing Production Example 1. Percent yield: 98%. The product was a compound which is sparingly soluble in a solvent.

[Ka 32]

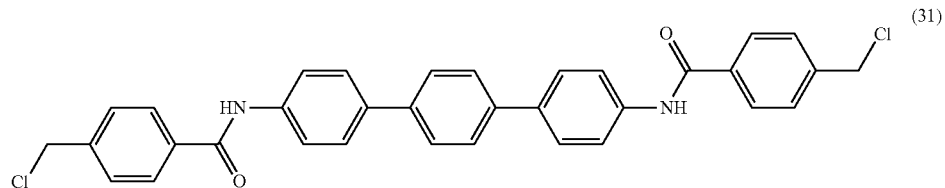

(31)

Example 18

An ionic organic compound represented by the following formula (32) was obtained in the same manner as in Example 1, except that in the foregoing Example 1, 4,4''-bis[(4-chloromethyl)benzamido]terphenyl was used in place of the 4,4'-bis[(4-chloromethyl)benzamido]-3,3'-dimethoxybiphenyl. Percent yield: 66%. The product was a compound which is sparingly soluble in a solvent.

[Ka 33]

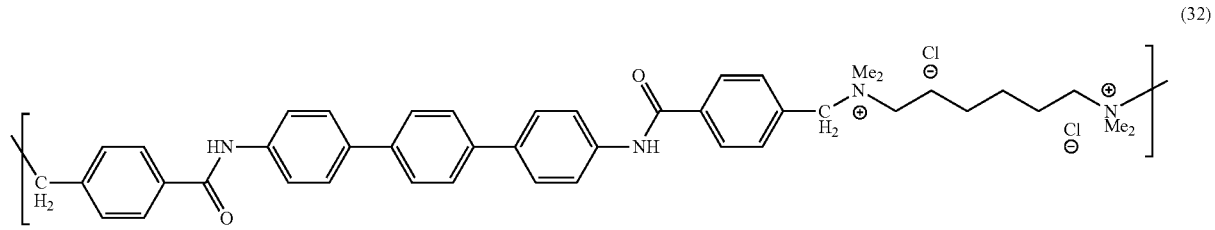

(32)

Production Example 14

Synthesis of 2,7-bis[(4-chloromethyl)benzamido]fluorene

A titled compound represented by the following formula (33) was obtained in the same manner as in Production Example 1, except that 2,7-diaminofluorene was used in place of the 4,4'-diamino-3,3'-dimethoxybiphenyl (o-dianisidine) in the foregoing Production Example 1. Percent yield: 99%. $^1$H-NMR (300 MHz, DMSO-$d_6$) δ 3.96 (s, 2H), 4.86 (s, 4H), 7.61 (d, J=8 Hz, 4H), 7.73-7.82 (m, 4H), 7.97 (d, J=8 Hz, 4H), 8.07 (s, 2H), 10.34 (s, 2H).

[Ka 34]

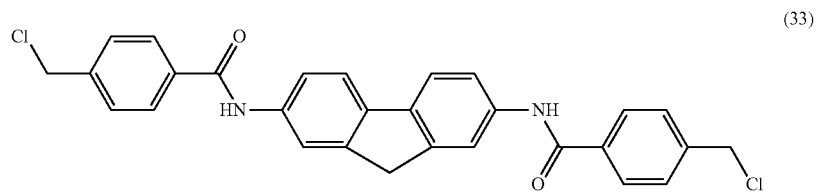

(33)

Example 19

An ionic organic compound represented by the following formula (34) was obtained in the same manner as in Example 1, except that in the foregoing Example 1, 2,7-bis[(4-chloromethyl)benzamido]fluorene was used in place of the 4,4'-bis[(4-chloromethyl)benzamido]-3,3'-dimethoxybiphenyl. Percent yield: 99%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $2.14 \times 10^4$, a weight average molecular weight ($M_w$) of $5.08 \times 10^4$ and a degree of dispersion of molecular weight distribution ($M_w/M_n$) of 2.4.

[Ka 35]

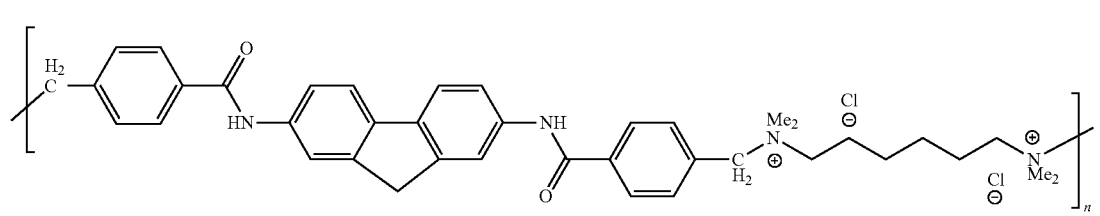

(34)

Production Example 15

Synthesis of 4,4'-bis[(4-chloromethyl)benzamido]stilbene

A titled compound represented by the following formula (35) was obtained in the same manner as in Production Example 1, except that 4,4'-diaminostilbene dihydrochloride was used in place of the 4,4'-diamino-3,3'-dimethoxybiphenyl (o-dianisidine) in the foregoing Production Example 1. Percent yield: 99%.

[Ka 36]

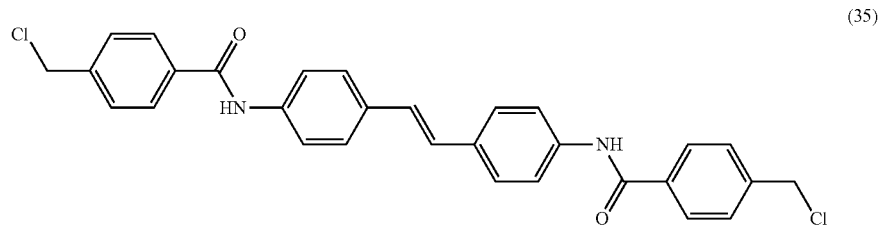

(35)

Example 20

An ionic organic compound represented by the following formula (36) was obtained in the same manner as in Example 1, except that in the foregoing Example 1, 4,4'-bis[(4-chloromethyl)benzamido]stilbene was used in place of the 4,4'-bis[(4-chloromethyl)benzamido]-3,3'-dimethoxybiphenyl. Percent yield: 99%. The product was a compound which is sparingly soluble in a solvent.

[Ka 37]

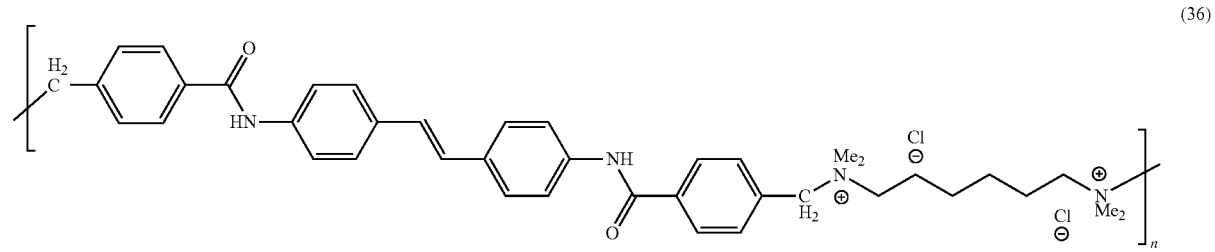

(36)

Production Example 16

Synthesis of 4,4'-bis[(4-chloromethyl)benzamido]azobenzene

A titled compound represented by the following formula (37) was obtained in the same manner as in Production Example 1, except that 4,4'-azodianiline was used in place of the 4,4'-diamino-3,3'-dimethoxybiphenyl (o-dianisidine) in the foregoing Production Example 1. Percent yield: 90%. $^1$H-NMR (300 MHz, DMSO-$d_6$) δ 4.86 (s, 4H), 7.62 (d, J=8 Hz, 4H), 7.92 (d, J=9 Hz, 4H), 7.99 (d, J=9 Hz, 4H), 8.03 (d, J=8 Hz, 4H), 10.60 (s, 2H).

[Ka 38]

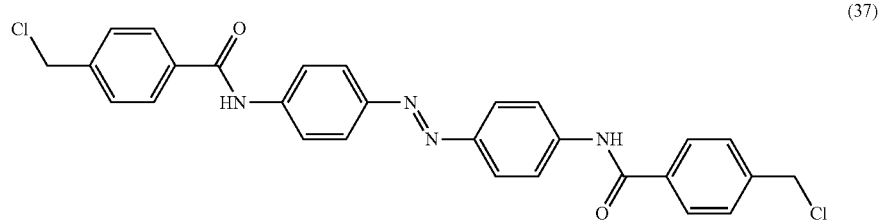

(37)

Example 21

An ionic organic compound represented by the following formula (38) was obtained in the same manner as in Example 1, except that in the foregoing Example 1, 4,4'-bis[(4-chloromethyl)benzamido]azobenzene was used in place of the 4,4'-bis[(4-chloromethyl)benzamido]-3,3'-dimethoxybiphenyl. Percent yield: 91%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $2.15 \times 10^4$, a weight average molecular weight ($M_w$) of $4.58 \times 10^4$ and a degree of dispersion of molecular weight distribution ($M_w/M_n$) of 2.1.

[Ka 39]

Production Example 17

Synthesis of 4,4'-bis[(4-chloromethyl)benzamido]-3,3'-dimethylbiphenyl

A titled compound represented by the following formula (39) was obtained in the same manner as in Production Example 1, except that o-toluidine was used in place of the 4,4'-diamino-3,3'-dimethoxybiphenyl (o-dianisidine) in the foregoing Production Example 1. Percent yield: 98%. $^1$H-NMR (300 MHz, DMSO-$d_6$) δ 4.86 (s, 4H), 7.62 (d, J=8 Hz, 4H), 7.92 (d, J=9 Hz, 4H), 7.99 (d, J=9 Hz, 4H), 8.03 (d, J=8 Hz, 4H), 10.60 (s, 2H).

[Ka 40]

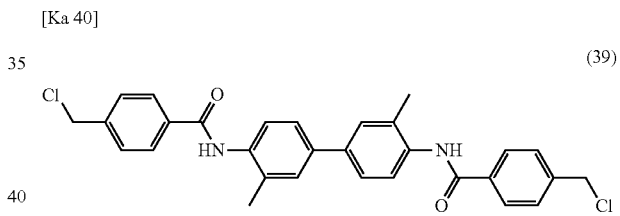

(39)

Example 22

An ionic organic compound represented by the following formula (40) was obtained in the same manner as in Example 1, except that in the foregoing Example 1, 4,4'-bis[(4-chloromethyl)benzamido]-3,3'-dimethylbiphenyl was used in place of the 4,4'-bis[(4-chloromethyl)benzamido]-3,3'-

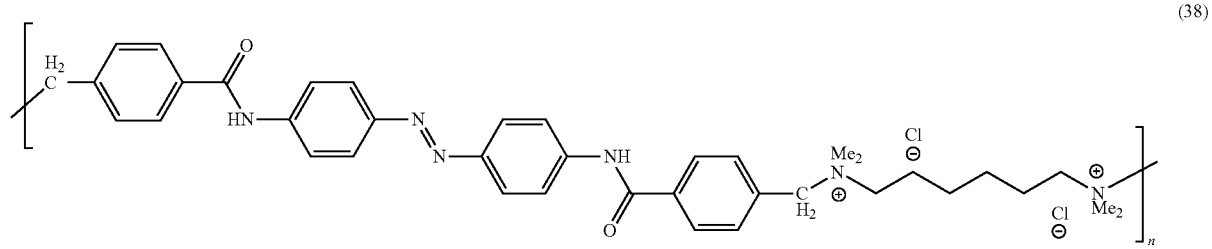

(38)

dimethoxybiphenyl. Percent yield: 91%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $3.74 \times 10^4$, a weight average molecular weight ($M_w$) of $8.93 \times 10^4$ and a degree of dispersion of molecular weight distribution ($M_w/M_n$) of 2.4.

Example 23

An ionic organic compound represented by the following formula (42) was obtained in the same manner as in Example 1, except that in the foregoing Example 1, 4,4'-bis[(4-chloromethyl)benzamido]-3,3',5,5'-tetramethylbiphenyl was used in place of the 4,4'-bis[(4-chloromethyl)benzamido]-3,3'-dimethoxybiphenyl. Percent yield: 94%. The progress of

[Ka 41]

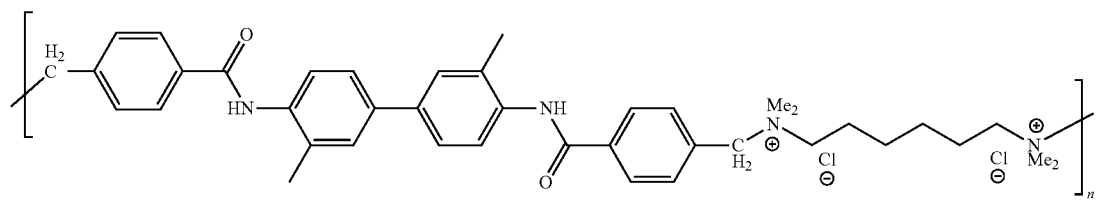

(40)

Production Example 18

Synthesis of 4,4'-bis[(4-chloromethyl)benzamido]-3,3',5,5'-tetramethylbiphenyl

A titled compound represented by the following formula (41) was obtained in the same manner as in Production Example 1, except that 3,3',5,5'-tetramethylbenzidine was used in place of the 4,4'-diamino-3,3'-dimethoxybiphenyl (o-dianisidine) in the foregoing Production Example 1. Perthe quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight ($M_n$) of $6.89 \times 10^4$, a weight average molecular weight ($M_w$) of $1.60 \times 10^5$ and a degree of dispersion of molecular weight distribution ($M_w/M_n$) of 2.3.

[Ka 43]

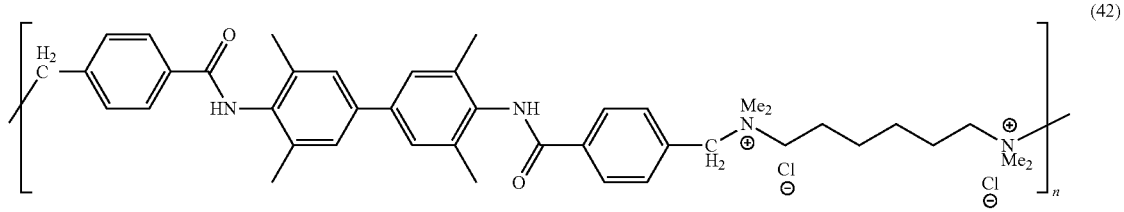

(42)

cent yield: 97%. $^1$H-NMR (300 MHz, DMSO-$d_6$) δ 2.26 (s, 12H), 4.86 (s, 4H), 7.46 (s, 4H), 7.61 (d, J=8 Hz, 4H), 8.02 (d, J=8 Hz, 4H), 9.84 (s, 2H).

[Ka 42]

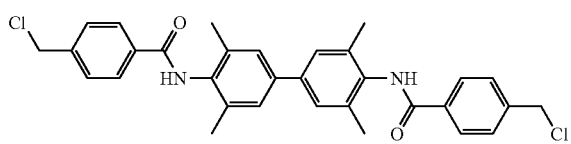

(41)

Production Example 19

Synthesis of 4,4'-bis[(4-chloromethyl)benzamido]-3-methoxy-6-methylazobenzene

A titled compound represented by the following formula (43) was obtained in the same manner as in Production Example 1, except that 4,4'-diamino-3-methoxy-6-methylazobenzene (Disperse Diazo Black-3BF) was used in place of the 4,4'-diamino-3,3'-dimethoxybiphenyl (o-dianisidine) in the foregoing Production Example 1. Percent yield: 58%. $^1$H-NMR (300 MHz, DMSO-$d_6$) δ 2.68 (s, 3H), 3.91 (s, 3H), 4.86 (s, 4H), 7.36 (s, 1H), 7.60-7.64 (m, 4H), 7.93-8.07 (m, 9H), 9.55 (s, 1H), 10.60 (s, 1H).

[Ka 44]

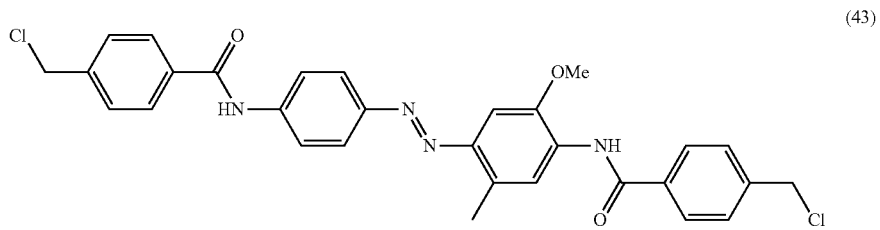

(43)

Example 24

An ionic organic compound represented by the following formula (44) was obtained in the same manner as in Example 1, except that in the foregoing Example 1, 4,4'-bis[(4-chloromethyl)benzamido]-3-methoxy-6-methylazobenzene was used in place of the 4,4'-bis[(4-chloromethyl)benzamido]-3,3'-dimethoxybiphenyl. Percent yield: 78%. The product was a compound which is sparingly soluble in a solvent.

[Ka 45]

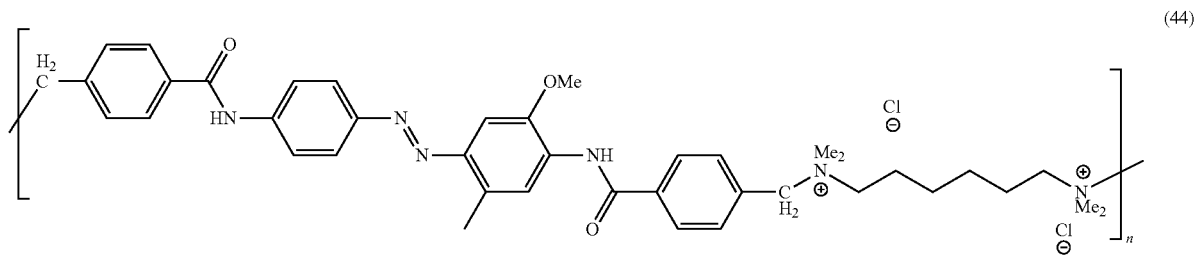

(44)

Example 25

The ionic compound (150 mg) obtained in the foregoing Example 1, which is represented by the formula (3), was dissolved in water (20 mL) at 80° C., to the solution of which was then added a lithium bis(trifluoromethanesulfonyl)amide (TFSA) aqueous solution (5 mL) having a concentration of 0.4 M, whereby a precipitate of a compound represented by the following formula (45) was formed. A structure of the obtained compound was confirmed by a proton NMR spectrum of the compound. $^1$H-NMR (300 MHz, DMSO-$d_6$) δ 1.40 (br, 4H), 1.87 (br, 4H), 3.00 (brs, 12H), 3.98 (brs, 6H), 4.61 (br, 3H), 7.38 (br, 4H), 7.71 (br, 4H), 7.87 (br, 2H), 8.14 (br, 4H), 9.64 (br, 2H). In the molecular weight distribution determined from the measurement of size exclusion chromatography, a cation principal chain moiety was estimated to have a number average molecular weight ($M_n$) of $1.91 \times 10^4$, a weight average molecular weight ($M_w$) of $7.96 \times 10^4$ and a degree of dispersion of molecular weight distribution ($M_w/M_n$) of 4.2.

[Ka 46]

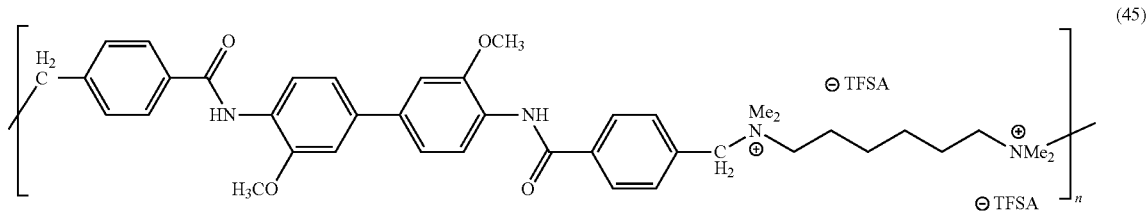

(45)

Example 26

A compound represented by the following formula (46) was obtained in the same manner as in Example 25, except that in the foregoing Example 25, the ionic compound obtained in Example 2, which is represented by the formula (4), was used in place of the ionic compound represented by the formula (3). A structure of the obtained compound was confirmed by a proton NMR spectrum of the compound. $^1$H-NMR (300 MHz, DMSO-$d_6$) δ 2.27 (br, 12H), 2.66 (br, 4H), 2.85 (br, 8H), 3.64 (br, 2H), 3.75 (br, 6H), 4.49 (br, 2H), 4.16 (br, 4H), 7.60 (br, 8H), 7.91 (br, 4H), 9.41 (br, 2H). In the molecular weight distribution determined from the measurement of size exclusion chromatography, a cation principal chain moiety was estimated to have a number average molecular weight ($M_n$) of $1.41 \times 10^5$, a weight average molecular weight ($M_w$) of $2.05 \times 10^5$ and a degree of dispersion of molecular weight distribution ($M_w/M_n$) of 1.5.

[Ka 47]

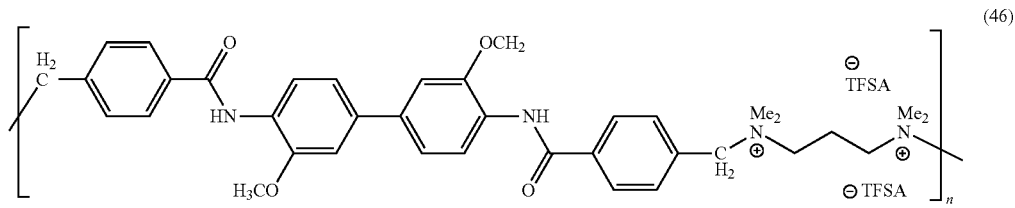

(46)

Example 27

A compound represented by the following formula (47) was obtained in the same manner as in Example 26, except that in the foregoing Example 26, the ionic compound obtained in Example 4, which is represented by the formula (7), was used in place of the ionic compound represented by the formula (4). A structure of the obtained compound was confirmed by a proton NMR spectrum of the compound. (TFSA) $^1$H-NMR (300 MHz, DMSO-$d_6$) δ 1.39 (br, 4H), 1.87 (br, 4H), 2.13 (br, 12H), 3.00 (br, 12H), 4.61 (br, 4H), 7.73 (br, 4H), 8.16 (br, 4H), 10.02 (br, 2H). In the molecular weight distribution determined from the measurement of size exclusion chromatography, a cation principal chain moiety was estimated to have a number average molecular weight ($M_n$) of $1.24 \times 10^4$, a weight average molecular weight ($M_w$) of $5.85 \times 10^4$ and a degree of dispersion of molecular weight distribution ($M_w/M_n$) of 4.7.

[Ka 48]

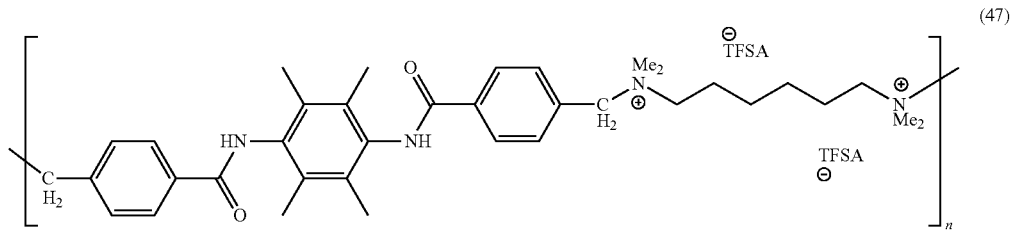

(47)

Example 27

A compound represented by the following formula (48) was obtained in the same manner as in Example 26, except that in the foregoing Example 26, the ionic compound obtained in Example 5, which is represented by the formula (9), was used in place of the ionic compound represented by the formula (4). A structure of the obtained compound was confirmed by a proton NMR spectrum of the compound. $^{1}$H-NMR (300 MHz, DMSO-$d_6$) δ 1.39 (br, 4H), 1.86 (br, 4H), 2.99 (br, 14H), 4.61 (br, 4H), 7.74 (br, 4H), 7.86 (br, 2H), 8.14 (br, 4H), 10.36 (br, 2H). In the molecular weight distribution determined from the measurement of size exclusion chromatography, a cation principal chain moiety was estimated to have a number average molecular weight ($M_n$) of $1.27 \times 10^4$, a weight average molecular weight ($M_w$) of $4.20 \times 10^4$ and a degree of dispersion of molecular weight distribution ($M_w/M_n$) of 3.3.

[Ka 49]

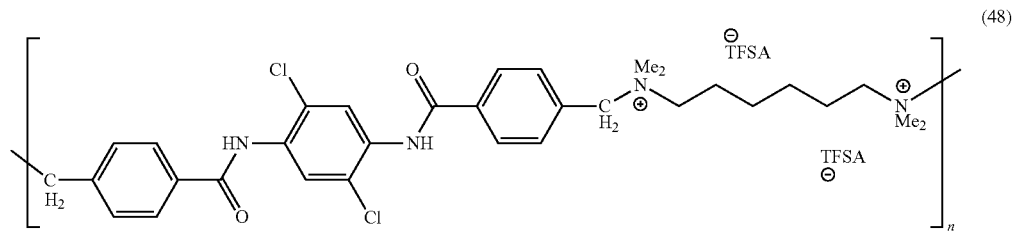

(48)

Example 28

A compound represented by the following formula (49) was obtained in the same manner as in Example 26, except that in the foregoing Example 26, the ionic compound obtained in Example 6, which is represented by the formula (11), was used in place of the ionic compound represented by the formula (4). A structure of the obtained compound was confirmed by a proton NMR spectrum of the compound. H-NMR (300 MHz, DMSO-$d_6$) δ 1.40 (br, 4H), 1.87 (br, 4H), 2.22 (br, 8H), 2.99 (br, 12H), 4.60 (br, 4H), 7.25 (br, 2H), 7.73 (br, 4H), 8.13 (br, 4H), 10.02 (br, 2H). In the molecular weight distribution determined from the measurement of size exclusion chromatography, a cation principal chain moiety was estimated to have a number average molecular weight ($M_n$) of $1.82 \times 10^4$, a weight average molecular weight ($M_w$) of $1.05 \times 10^5$ and a degree of dispersion of molecular weight distribution ($M_w/M_n$) of 5.8.

[Ka 50]

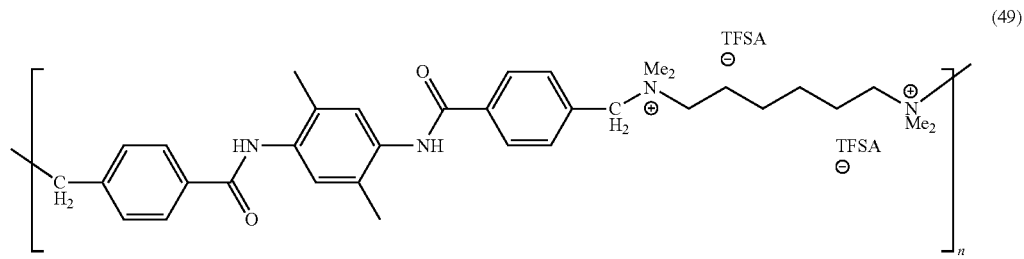

(49)

Example 29

A compound represented by the following formula (50) was obtained in the same manner as in Example 26, except that in the foregoing Example 26, the ionic compound obtained in Example 7, which is represented by the formula (13), was used in place of the ionic compound represented by the formula (4). A structure of the obtained compound was confirmed by a proton NMR spectrum of the compound. $^1$H-NMR (300 MHz, DMSO-$d_6$) δ 1.40 (br, 4H), 1.87 (br, 4H), 2.22 (br, 8H), 2.99 (br, 12H), 4.60 (br, 4H), 7.25 (br, 2H), 7.73 (br, 4H), 8.13 (br, 4H), 10.02 (br, 2H). In the molecular weight distribution determined from the measurement of size exclusion chromatography, a cation principal chain moiety was estimated to have a number average molecular weight ($M_n$) of $2.45 \times 10^4$, a weight average molecular weight ($M_w$) of $5.06 \times 10^4$ and a degree of dispersion of molecular weight distribution ($M_w/M_n$) of 2.1.

[Ka 51]

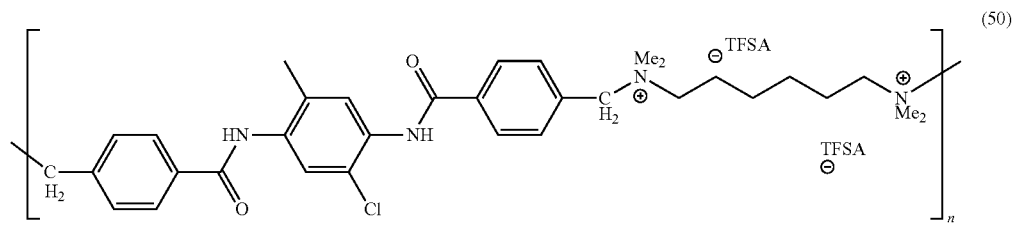

(50)

Example 30

A compound represented by the following formula (51) was obtained in the same manner as in Example 26, except that in the foregoing Example 26, the ionic compound obtained in Example 8, which is represented by the formula (15), was used in place of the ionic compound represented by the formula (4). A structure of the obtained compound was confirmed by a proton NMR spectrum of the compound. $^1$H-NMR (300 MHz, DMSO-$d_6$) δ 1.40 (br, 5H), 1.88 (br, 4H), 2.25 (br, 4H), 2.99 (br, 16H), 4.60 (br, 4H), 7.30 (br, 1H), 7.70 (br, 8H), 8.11 (br, 4H), 10.01 (br, 1H), 10.36 (br, 1H). In the molecular weight distribution determined from the measurement of size exclusion chromatography, a cation principal chain moiety was estimated to have a number average molecular weight ($M_n$) of $5.92 \times 10^4$, a weight average molecular weight ($M_w$) of $1.66 \times 10^5$ and a degree of dispersion of molecular weight distribution ($M_w/M_n$) of 2.8.

[Ka 52]

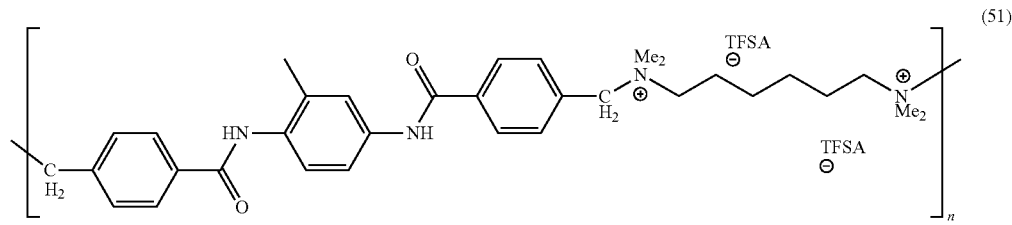

(51)

Example 31

A compound represented by the following formula (52) was obtained in the same manner as in Example 26, except that in the foregoing Example 26, the ionic compound obtained in Example 11, which is represented by the formula (21), was used in place of the ionic compound represented by the formula (4). A structure of the obtained compound was confirmed by a proton NMR spectrum of the compound. $^1$H-NMR (300 MHz, DMSO-$d_6$) δ 1.40 (br, 5H), 1.88 (br, 4H), 2.25 (br, 4H), 2.99 (br, 16H), 4.60 (br, 4H), 7.30 (br, 1H), 7.70 (br, 8H), 8.11 (br, 4H), 10.01 (br, 1H), 10.36 (br, 1H). In the molecular weight distribution determined from the measurement of size exclusion chromatography, a cation principal chain moiety was estimated to have a number average molecular weight ($M_n$) of $1.75 \times 10^4$, a weight average molecular weight ($M_w$) of $8.01 \times 10^4$ and a degree of dispersion of molecular weight distribution ($M_w/M_n$) of 4.6.

[Ka 53]

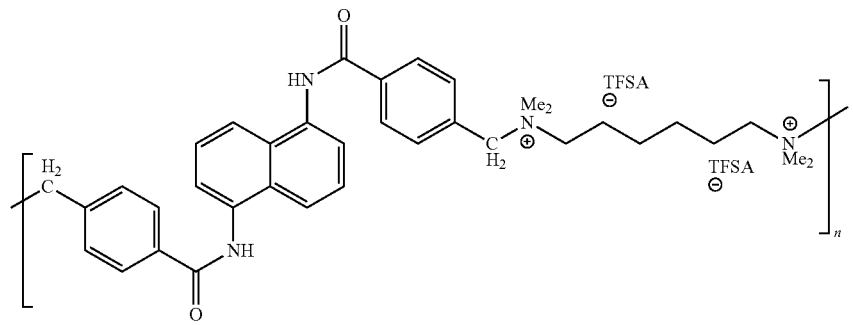

(52)

Example 32

A compound represented by the following formula (53) was obtained in the same manner as in Example 26, except that in the foregoing Example 26, the ionic compound obtained in Example 12, which is represented by the formula (23), was used in place of the ionic compound represented by the formula (4). A structure of the obtained compound was confirmed by a proton NMR spectrum of the compound. $^1$H-NMR (300 MHz, DMSO-$d_6$) δ 1.39 (br, 4H), 1.86 (br, 4H), 2.99 (br, 14H), 4.60 (br, 3H), 7.73 (br, 10H), 7.99 (br, 5H), 8.12 (br, 5H), 10.19 (br, 1H), 10.36 (br, 1H), 10.62 (br, 1H). In the molecular weight distribution determined from the measurement of size exclusion chromatography, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 54]

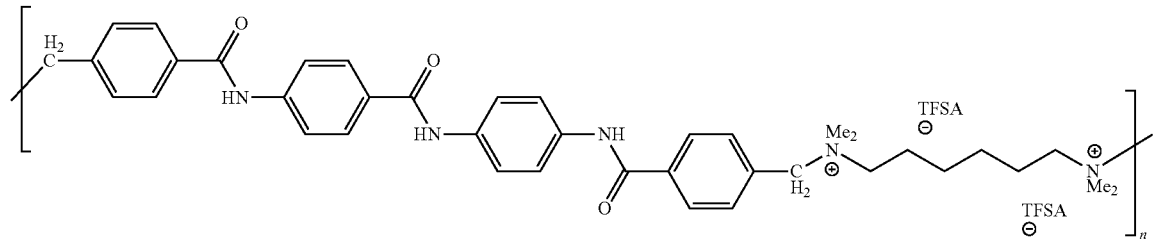

(53)

Example 33

A compound represented by the following formula (54) was obtained in the same manner as in Example 26, except that in the foregoing Example 26, the ionic compound obtained in Example 15, which is represented by the formula (25), was used in place of the ionic compound represented by the formula (4). A structure of the obtained compound was confirmed by a proton NMR spectrum of the compound. $^1$H-NMR (300 MHz, DMSO-$d_6$) δ 3.11 (br, 16H), 4.66 (br, 4H), 7.77 (br, 10H), 8.00 (br, 4H), 8.14 (br, 4H), 10.19 (br, 1H), 10.37 (br, 1H), 10.63 (br, 1H). In the molecular weight distribution determined from the measurement of size exclusion chromatography, a cation principal chain moiety was estimated to have a number average molecular weight ($M_n$) of 2.20×10$^4$, a weight average molecular weight ($M_w$) of 5.11× 10$^4$ and a degree of dispersion of molecular weight distribution ($M_w/M_n$) of 2.3.

[Ka 55]

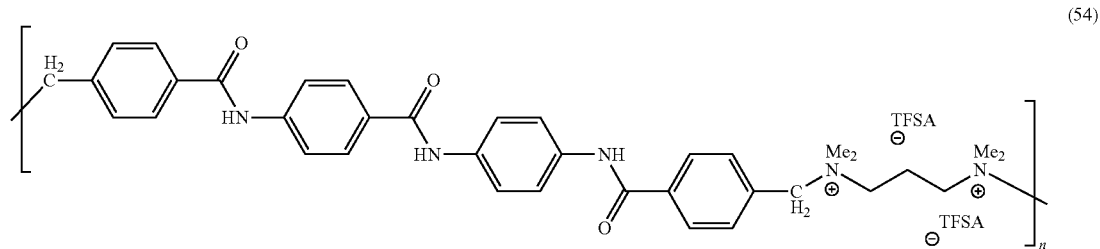

(54)

Example 34

A compound represented by the following formula (55) was obtained in the same manner as in Example 26, except that in the foregoing Example 26, the ionic compound obtained in Example 19, which is represented by the formula (34), was used in place of the ionic compound represented by the formula (4). A structure of the obtained compound was confirmed by a proton NMR spectrum of the compound. $^1$H-NMR (300 MHz, DMSO-$d_6$) δ 1.40 (br, 4H), 1.86 (br, 4H), 3.00 (br, 14H), 3.97 (br, 2H), 4.61 (br, 4H), 4.86 (s, 1H), 7.78 (br, 9H), 8.12 (br, 6H), 10.43 (be, 2H). In the molecular weight distribution determined from the measurement of size exclusion chromatography, a cation principal chain moiety was estimated to have a number average molecular weight ($M_n$) of 2.14×10$^4$, a weight average molecular weight ($M_w$) of 5.08×10$^4$ and a degree of dispersion of molecular weight distribution ($M_w/M_n$) of 2.4.

[Ka 56]

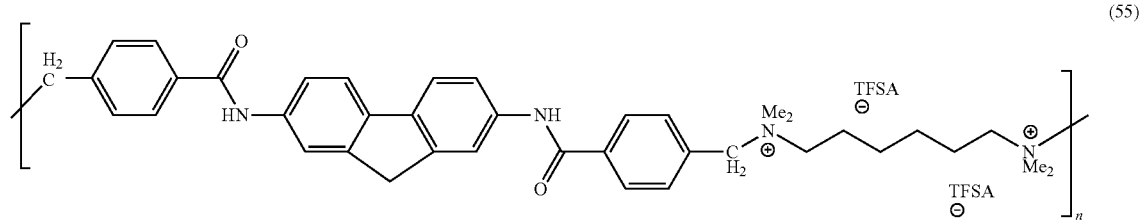

(55)

Example 35

A compound represented by the following formula (56) was obtained in the same manner as in Example 26, except that in the foregoing Example 26, the ionic compound obtained in Example 21, which is represented by the formula (38), was used in place of the ionic compound represented by the formula (4). A structure of the obtained compound was confirmed by a proton NMR spectrum of the compound. $^1$H-NMR (300 MHz, DMSO-$d_6$) δ 1.39 (br, 5H), 4.53 (br, 4H), 3.00 (br, 18H), 4.61 (br, 4H), 7.75 (br, 5H), 7.94 (br, 5H), 8.06 (br, 12H), 10.68 (br, 2H). In the molecular weight distribution determined from the measurement of size exclusion chromatography, a cation principal chain moiety was estimated to have a number average molecular weight ($M_n$) of 2.15×10$^4$, a weight average molecular weight ($M_w$) of 4.58× 10$^4$ and a degree of dispersion of molecular weight distribution ($M_w/M_n$) of 2.1.

[Ka 57]

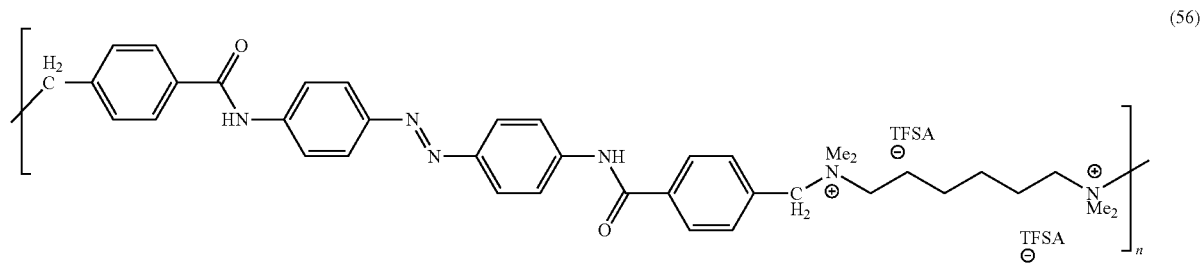

(56)

Example 36

A compound represented by the following formula (57) was obtained in the same manner as in Example 26, except that in the foregoing Example 26, the ionic compound obtained in Example 22, which is represented by the formula (40), was used in place of the ionic compound represented by the formula (4). A structure of the obtained compound was confirmed by a proton NMR spectrum of the compound. $^1$H-NMR (300 MHz, DMSO-$d_6$) δ 1.39 (br, 4H), 1.88 (br, 4H), 2.29 (br, 8H), 3.03 (br, 14H), 4.61 (br, 4H), 7.45 (br, 2H), 7.64 (br, 9H), 8.15 (br, 4H), 10.07 (br, 2H). In the molecular weight distribution determined from the measurement of size exclusion chromatography, a cation principal chain moiety was estimated to have a number average molecular weight ($M_n$) of 3.74×10$^4$, a weight average molecular weight ($M_w$) of 8.93×10$^4$ and a degree of dispersion of molecular weight distribution ($M_w/M_n$) of 2.4.

[Ka 58]

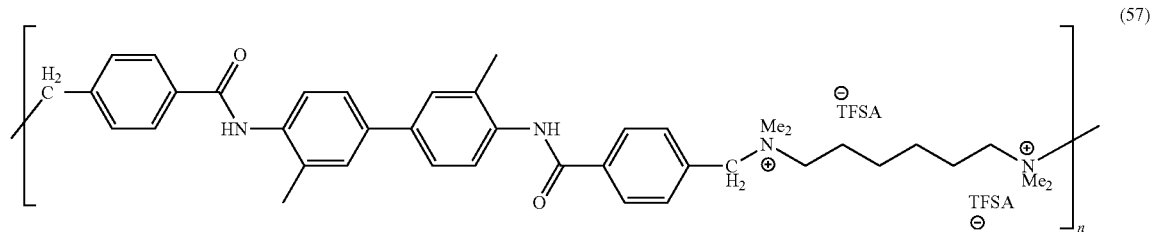

(57)

Example 37

A compound represented by the following formula (58) was obtained in the same manner as in Example 26, except that in the foregoing Example 26, the ionic compound obtained in Example 23, which is represented by the formula (42), was used in place of the ionic compound represented by the formula (4). A structure of the obtained compound was confirmed by a proton NMR spectrum of the compound. $^1$H-NMR (300 MHz, DMSO-$d_6$) δ 1.40 (br, 4H), 1.88 (br, 4H), 2.20 (br, 16H), 2.73 (br, 8H), 2.89 (br, 8H), 3.01 (br, 14H), 4.61 (br, 2H), 7.48 (br, 4H), 7.74 (br, 4H), 7.95 (br, 2H), 8.16 (br, 4H), 9.96 (br, 2H). In the molecular weight distribution determined from the measurement of size exclusion chromatography, a cation principal chain moiety was estimated to have a number average molecular weight ($M_n$) of 6.89×10$^4$, a weight average molecular weight ($M_w$) of 1.60×10$^5$ and a degree of dispersion of molecular weight distribution ($M_w/M_n$) of 2.3.

[Ka 59]

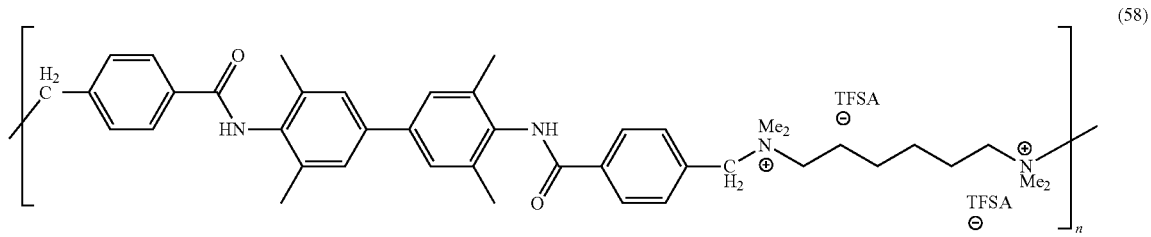

(58)

Example 38

A precipitate of a compound represented by the following formula (59) was formed in the same manner as in Example 25, except that in the foregoing Example 25, an ammonium hexafluorophosphate (NH$_4$ PF$_6$) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-$d_6$) δ 1.39 (br s, 4H), 1.86 (br s, 4H), 3.00 (s, 12H), 3.32 (br s, 4H), 3.97 (s, 6H), 4.60 (br s, 4H), 7.36 (br d, J=8.0 Hz, 2H), 7.40 (s, 2H), 7.72 (br d, J=7.8 Hz, 4H), 7.86 (br d, J=8.0 Hz, 2H), 8.13 (br d, J=7.8 Hz, 4H), 9.63 (s, 2H).

In the molecular weight distribution determined from the measurement of size exclusion chromatography of a TFSA derivative as described later, a cation principal chain moiety was estimated to have a number average molecular weight ($M_n$) of 1.91×10$^4$, a weight average molecular weight ($M_w$) of 7.96×10$^4$ and a degree of dispersion of molecular weight distribution ($M_w/M_n$) of 4.2.

[Ka 60]

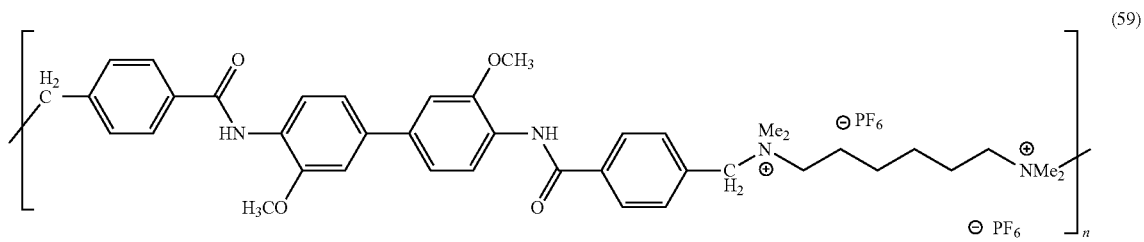

(59)

Example 39

A precipitate of a compound represented by the following formula (60) was formed in the same manner as in Example 25, except that in the foregoing Example 25, an ammonium tetrafluoroborate ($NH_4BF_4$) solution was used in the place of the lithium bis(trifluoromethanesulfonyl)amide (TFSA) aqueous solution. A structure of the obtained compound was confirmed by a proton NMR spectrum of the compound. $^1H$ NMR (400 MHz, DMSO-$d_6$) δ 1.39 (br s, 4H), 1.86 (br s, 4H), 3.00 (s, 12H), 3.32 (br s, 4H), 3.97 (s, 6H), 4.60 (br s, 4H), 7.36 (br d, J=8.0 Hz, 2H), 7.41 (s, 2H), 7.72 (br d, J=7.8 Hz, 4H), 7.86 (br d, J=8.0 Hz, 2H), 8.13 (br d, J=7.8 Hz, 4H), 9.63 (s, 2H).

In the molecular weight distribution determined from the measurement of size exclusion chromatography of a TFSA derivative as described later, a cation principal chain moiety was estimated to have a number average molecular weight ($M_n$) of $1.91 \times 10^4$, a weight average molecular weight ($M_w$) of $7.96 \times 10^4$ and a degree of dispersion of molecular weight distribution ($M_w/M_n$) of 4.2.

[Ka 61]

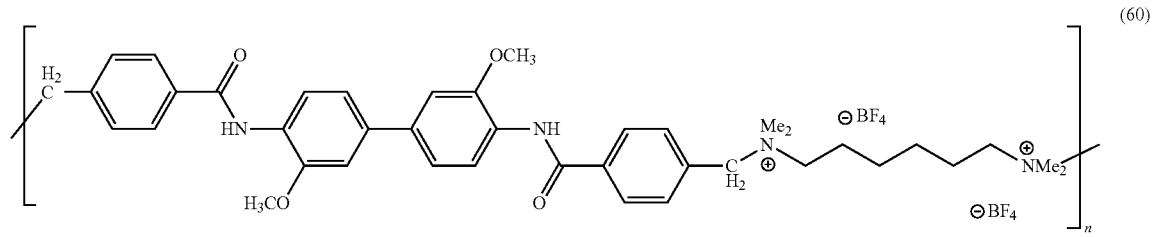

Example 40

A precipitate of a compound represented by the following formula (61) was formed in the same manner as in Example 25, except that in the foregoing Example 25, a lithium perchlorate ($LiClO_4$) solution was used in the place of the lithium bis(trifluoromethanesulfonyl)amide (TFSA) aqueous solution. A structure of the obtained compound was confirmed by a proton NMR spectrum of the compound. $^1H$ NMR (400 MHz, DMSO-$d_6$) δ 1.39 (br s, 4H), 1.86 (br s, 4H), 3.00 (s, 12H), 3.31 (br s, 4H), 3.97 (s, 6H), 4.61 (br s, 4H), 7.36 (br d, J=8.0 Hz, 2H), 7.40 (s, 2H), 7.72 (br d, J=7.8 Hz, 4H), 7.86 (br d, J=8.0 Hz, 2H), 8.13 (br d, J=7.8 Hz, 4H), 9.63 (s, 2H).

In the molecular weight distribution determined from the measurement of size exclusion chromatography of a TFSA derivative as described later, a cation principal chain moiety was estimated to have a number average molecular weight ($M_n$) of $1.91 \times 10^4$, a weight average molecular weight ($M_w$) of $7.96 \times 10^4$ and a degree of dispersion of molecular weight distribution ($M_w/M_n$) of 4.2.

[Ka 62]

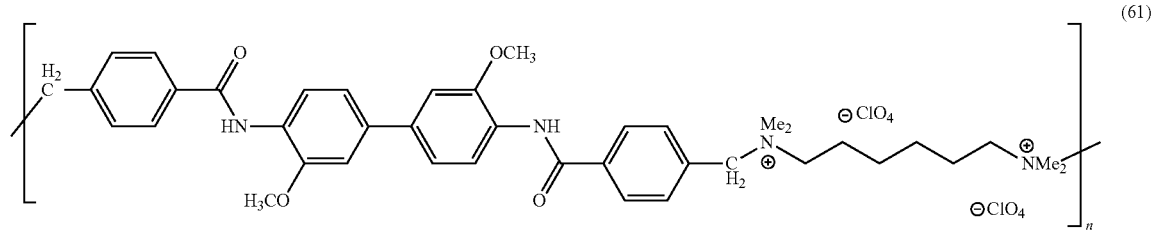

Example 41

A precipitate of a compound represented by the following formula (62) was formed in the same manner as in Example 32, except that in the foregoing Example 32, an ammonium hexafluorophosphate ($NH_4 PF_6$) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-$d_6$) δ 1.38 (br s, 4H), 1.85 (br s, 4H), 2.99 (s, 12H), 3.31 (br s, 4H), 4.60 (br s, 4H), 7.70-7.78 (m, 8H), 7.95 (br d, J=8.2 Hz, 2H), 8.01 (br d, J=8.5 Hz, 2H), 8.09-8.13 (m, 4H), 10.18 (br s, 1H), 10.35 (br s, 1H), 10.61 (br s, 1H).

In the molecular weight distribution determined from the measurement of size exclusion chromatography of a TFSA derivative as described later, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 63]

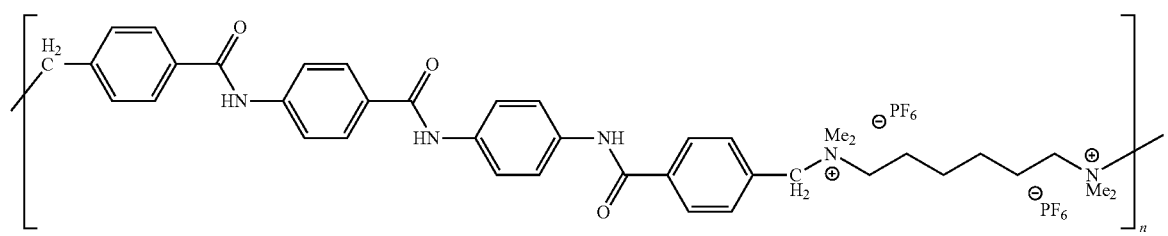

(62)

Example 42

A precipitate of a compound represented by the following formula (63) was formed in the same manner as in Example 32, except that in the foregoing Example 32, an ammonium tetrafluoroborate ($NH_4BF_4$) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-$d_6$) δ 1.38 (br s, 4H), 1.86 (br s, 4H), 2.99 (s, 12H), 3.31 (br s, 4H), 4.60 (br s, 4H), 7.70-7.78 (m, 8H), 7.95 (br d, J=8.2 Hz, 2H), 8.01 (br d, J=8.5 Hz, 2H), 8.09-8.13 (m, 4H), 10.18 (br s, 1H), 10.35 (br s, 1H), 10.61 (br s, 1H).

In the molecular weight distribution determined from the measurement of size exclusion chromatography of a TFSA derivative as described later, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 64]

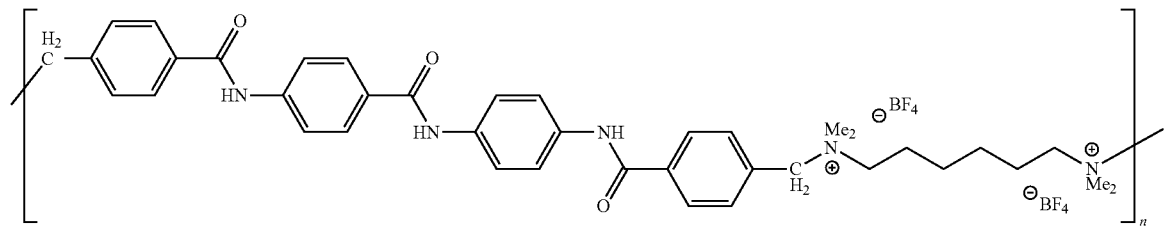

(63)

Example 43

A precipitate of a compound represented by the following formula (64) was formed in the same manner as in Example 32, except that in the foregoing Example 32, a lithium perchlorate ($LiClO_4$) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-$d_6$) δ 1.38 (br s, 4H), 1.85 (br s, 4H), 2.99 (s, 12H), 3.32 (br s, 4H), 4.60 (br s, 4H), 7.70-7.78 (m, 8H), 7.95 (br d, J=8.2 Hz, 2H), 8.01 (br d, J=8.5 Hz, 2H), 8.09-8.13 (m, 4H), 10.18 (br s, 1H), 10.35 (br s, 1H), 10.61 (br s, 1H).

In the molecular weight distribution determined from the measurement of size exclusion chromatography of a TFSA derivative as described later, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 65]

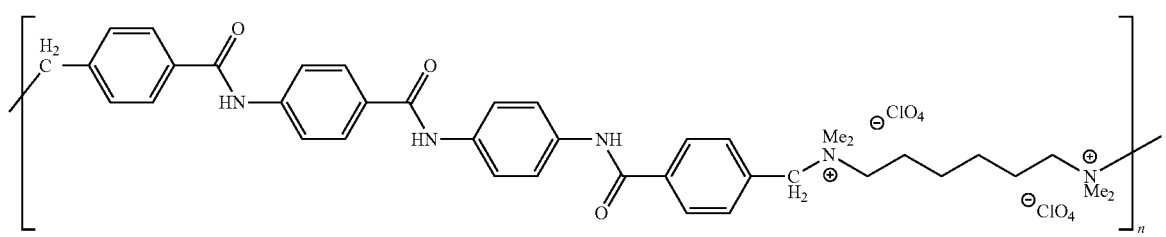

(64)

Example 44

A precipitate of a compound represented by the following formula (65) was formed in the same manner as in Example 32, except that in the foregoing Example 32, a sodium thiocyanate (NaSCN) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-$d_6$) δ 1.39 (br s, 4H), 1.87 (br s, 4H), 3.01 (s, 12H), 3.32 (br s, 4H), 4.62 (br s, 4H), 7.70-7.78 (m, 8H), 7.95 (br d, J=8.2 Hz, 2H), 8.01 (br d, J=8.5 Hz, 2H), 8.09-8.13 (m, 4H), 10.18 (br s, 1H), 10.36 (br s, 1H), 10.62 (br s, 1H).

In the molecular weight distribution determined from the measurement of size exclusion chromatography of a TFSA derivative as described later, a cation principal chain moiety was estimated to have a number average molecular weight ($M_n$) of $1.04 \times 10^4$, a weight average molecular weight ($M_w$) of $3.13 \times 10^4$ and a degree of dispersion of molecular weight distribution ($M_w/M_n$) of 3.0.

[Ka 66]

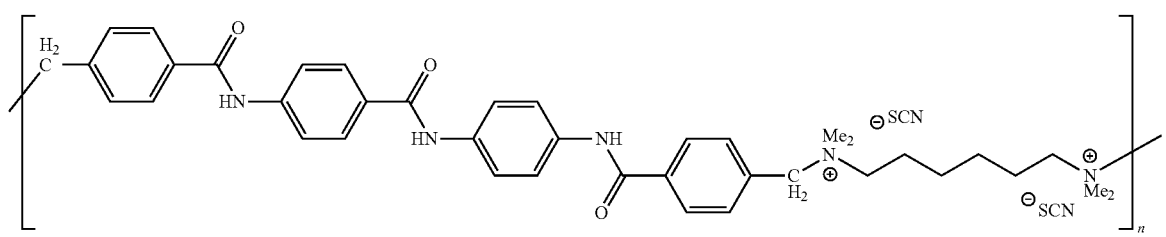

(65)

Example 45

A precipitate of a compound represented by the following formula (66) was formed in the same manner as in Example 34, except that in the foregoing Example 34, an ammonium hexafluorophosphate ($NH_4PF_6$) solution was used in the place of the lithium bis(trifluoromethanesulfonyl)amide (TFSA) aqueous solution. A structure of the obtained compound was confirmed by a proton NMR spectrum of the compound. $^1H$ NMR (400 MHz, DMSO-$d_6$) δ 1.39 (br s, 4H), 1.86 (br s, 4H), 3.00 (s, 12H), 3.31 (br s, 4H), 3.97 (br s, 2H), 4.60 (br s, 4H), 7.70-7.76 (m, 6H), 7.83 (br d, J=8.5 Hz, 2H), 8.07-8.15 (m, 6H), 10.43 (s, 2H).

In the molecular weight distribution determined from the measurement of size exclusion chromatography of a TFSA derivative as described later, a cation principal chain moiety was estimated to have a number average molecular weight ($M_n$) of $2.14 \times 10^4$, a weight average molecular weight ($M_w$) of $5.08 \times 10^4$ and a degree of dispersion of molecular weight distribution ($M_w/M_n$) of 2.4.

[Ka 67]

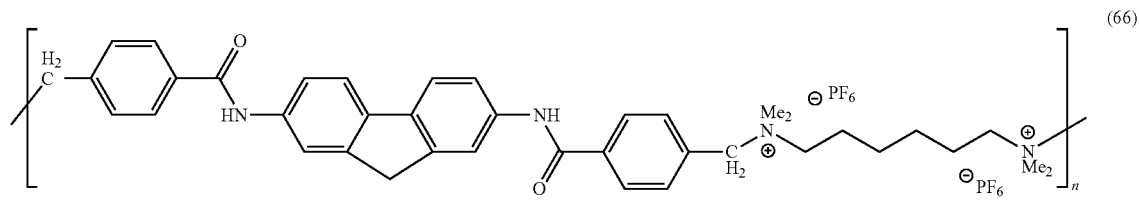

(66)

Example 46

A precipitate of a compound represented by the following formula (67) was formed in the same manner as in Example 34, except that in the foregoing Example 34, an ammonium tetrafluoroborate ($NH_4BF_4$) solution was used in the place of the lithium bis(trifluoromethanesulfonyl)amide (TFSA) aqueous solution. A structure of the obtained compound was confirmed by a proton NMR spectrum of the compound. $^1H$ NMR (400 MHz, DMSO-$d_6$) δ 1.39 (br s, 4H), 1.86 (br s, 4H), 2.99 (s, 12H), 3.31 (br s, 4H), 3.97 (br s, 2H), 4.60 (br s, 4H), 7.70-7.76 (m, 6H), 7.83 (br d, J=8.5 Hz, 2H), 8.07-8.15 (m, 6H), 10.42 (s, 2H).

In the molecular weight distribution determined from the measurement of size exclusion chromatography of a TFSA derivative as described later, a cation principal chain moiety was estimated to have a number average molecular weight ($M_n$) of $2.14 \times 10^4$, a weight average molecular weight ($M_w$) of $5.08 \times 10^4$ and a degree of dispersion of molecular weight distribution ($M_w/M_n$) of 2.4.

[Ka 68]

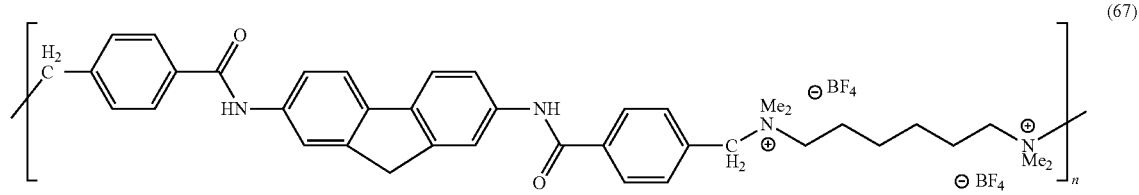

(67)

Example 47

A precipitate of a compound represented by the following formula (68) was formed in the same manner as in Example 34, except that in the foregoing Example 34, a lithium perchlorate (LiClO$_4$) solution was used in the place of the lithium bis(trifluoromethanesulfonyl)amide (TFSA) aqueous solution. A structure of the obtained compound was confirmed by a proton NMR spectrum of the compound. $^1$H NMR (400 MHz, DMSO-d$_6$) δ 1.39 (br s, 4H), 1.86 (br s, 4H), 3.00 (s, 12H), 3.31 (br s, 4H), 3.97 (br s, 2H), 4.60 (br s, 4H), 7.70-7.76 (m, 6H), 7.83 (br d, J=8.5 Hz, 2H), 8.07-8.15 (m, 6H), 10.43 (s, 2H).

In the molecular weight distribution determined from the measurement of size exclusion chromatography of a TFSA derivative as described later, a cation principal chain moiety was estimated to have a number average molecular weight (M$_n$) of 2.14×10$^4$, a weight average molecular weight (M$_w$) of 5.08×10$^4$ and a degree of dispersion of molecular weight distribution (M$_w$/M$_n$) of 2.4.

1.49 (m, 4H), 1.89-1.91 (m, 4H), 3.77 (br, 2H), 4.81 (s, 4H), 7.51 (d, J=8.2 Hz, 4H), 7.84 (d, J=8.2 Hz, 4H), 8.29 (d, J=7.8 Hz, 2H)

[Ka 70]

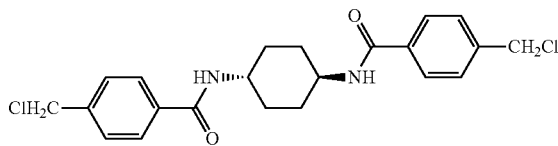

(69)

Example 48

An ionic organic compound represented by the following formula (70) was obtained in the same manner as in Example 1, except that in the foregoing Example 1, trans-1,4-bis[(4-chloromethyl)benzamido]cyclohexane was used in place of the 4,4'-bis[(4-chloromethyl)benzamido]-3,3'-dimethoxybiphenyl. Percent yield: 93%. The progress of the quaternization reaction and structure were confirmed by a $^1$H-NMR spectrum of a TFSA derivative as described later. Furthermore, in the molecular weight distribution determined from the measurement of size exclusion chromatography of the TFSA derivative, a cation principal chain moiety was estimated to have a number average molecular weight (M$_n$) of 1.20×10$^4$, a weight average molecular weight (M$_w$) of 4.36×10$^4$ and a degree of dispersion of molecular weight distribution (M$_w$/M$_n$) of 3.6.

[Ka 69]

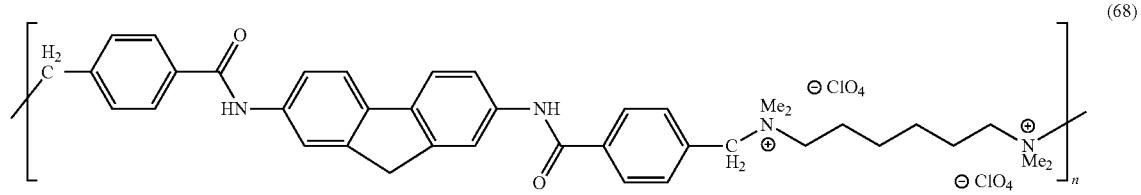

(68)

Production Example 20

Synthesis of trans-1,4-bis[(4-chloromethyl)benzamido]cyclohexane

A titled compound represented by the following formula (69) was obtained in the same manner as in Production Example 1, except that trans-1,4-diaminocyclohexane was used in place of the 4,4'-diamino-3,3'-dimethoxybiphenyl (o-dianisidine) in the foregoing Production Example 1. Percent yield: 90%. $^1$H-NMR (300 MHz, DMSO-d$_6$, δ) 1.43-

[Ka 71]

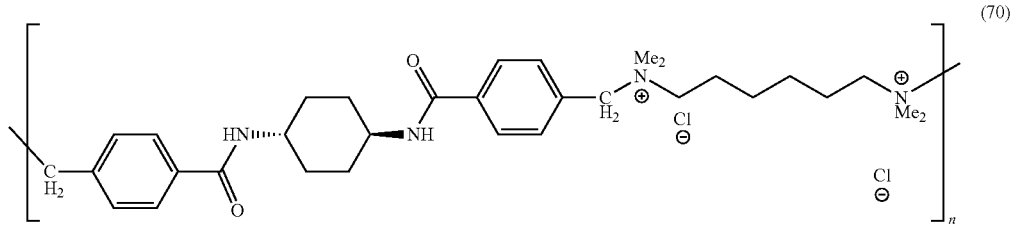

(70)

Example 49

A compound represented by the following formula (71) was obtained in the same manner as in Example 25, except that in the foregoing Example 25, the ionic compound obtained in Example 48, which is represented by the formula (70), was used in place of the ionic compound represented by the formula (3). A structure of the obtained compound was confirmed by a proton NMR spectrum of the compound. Furthermore, in the molecular weight distribution determined from the measurement of size exclusion chromatography of this TFSA derivative, a cation principal chain moiety was estimated to have a number average molecular weight ($M_n$) of $1.20 \times 10^4$, a weight average molecular weight ($M_w$) of $4.36 \times 10^4$ and a degree of dispersion of molecular weight distribution ($M_w/M_n$) of 3.6.

[Ka 72]

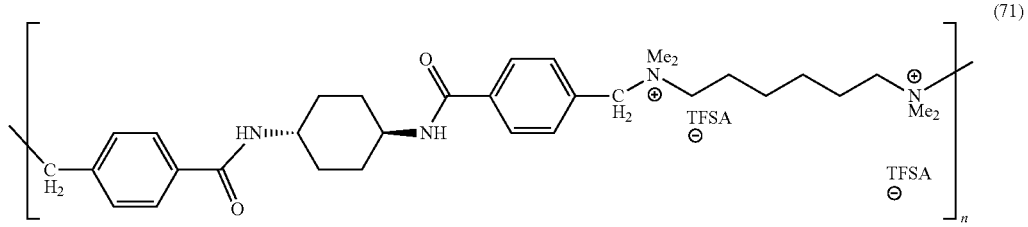

Example 50

Each of the TFSA counter anion-containing ionic organic compounds of the formulae (45) to (58) and (71), which were obtained in Examples 25 to 37, respectively, was subjected to the molecular weight measurement by a size exclusion chromatography system (Shimadzu Corporation). Shodex Asahipak GF-510 HQ was used as a column. A flow rate was set to 0.4 mL/min. A temperature of the column was kept at 40° C. by a column oven (Shimadzu Corporation). N,N-Dimethylformamide containing 30 mM of lithium bis(trifluoromethanesulfonyl)imide was used as an eluent. A molecular weight on the basis of poly(methyl methacrylate) was calculated based on a chromatogram obtained by a differential refractometer. Calculated molecular weights (molecular weights of only the cation principal chain moiety not containing an anion moiety due to restrictions on the measurement) are shown in the following Table 4.

TABLE 4

| General formula of compound | Number average molecular weight ($M_n$) | Weight average molecular weight ($M_w$) | Degree of dispersion ($M_w/M_n$) |
|---|---|---|---|
| (45) | $1.91 \times 10^4$ | $7.96 \times 10^4$ | 4.2 |
| (46) | $1.41 \times 10^5$ | $2.05 \times 10^5$ | 1.5 |
| (47) | $1.24 \times 10^4$ | $5.85 \times 10^4$ | 4.7 |
| (48) | $1.27 \times 10^4$ | $4.20 \times 10^4$ | 3.3 |
| (49) | $1.82 \times 10^4$ | $1.05 \times 10^5$ | 5.8 |
| (50) | $2.45 \times 10^4$ | $5.06 \times 10^4$ | 2.1 |
| (51) | $5.92 \times 10^4$ | $1.66 \times 10^5$ | 2.8 |
| (52) | $1.75 \times 10^4$ | $8.01 \times 10^4$ | 4.6 |
| (53) | $1.04 \times 10^4$ | $3.13 \times 10^4$ | 3.0 |
| (54) | $2.20 \times 10^4$ | $5.11 \times 10^4$ | 2.3 |
| (55) | $2.14 \times 10^4$ | $5.08 \times 10^4$ | 2.4 |
| (56) | $2.15 \times 10^4$ | $4.58 \times 10^4$ | 2.1 |
| (57) | $3.74 \times 10^4$ | $8.93 \times 10^4$ | 2.4 |
| (58) | $6.89 \times 10^4$ | $1.60 \times 10^5$ | 2.3 |
| (71) | $1.20 \times 10^4$ | $4.36 \times 10^4$ | 3.6 |

Example 51

The ionic organic compound of the formula (23), which was obtained in the foregoing Example 12, was charged together with water in sample bottles having an internal volume of 10 mL such that its concentration was 20 g/L, 30 g/L and 50 g/L, respectively and then dissolved under heating, whereby transparent solutions were obtained. Each of the solutions was allowed to stand at room temperature, whereby hydrogels were obtained under all of conditions. In these hydrogels, as seen in a photograph of FIG. 1, even when the sample bottles were inverted, the contents did not fall.

Similarly, by using the compounds of the formulae (3), (7), (11) and (34), which were obtained in the foregoing Examples, respectively, similar hydrogels were obtained (the concentration range is from about 50 to 100 g/L).

Example 52

Figure 2:
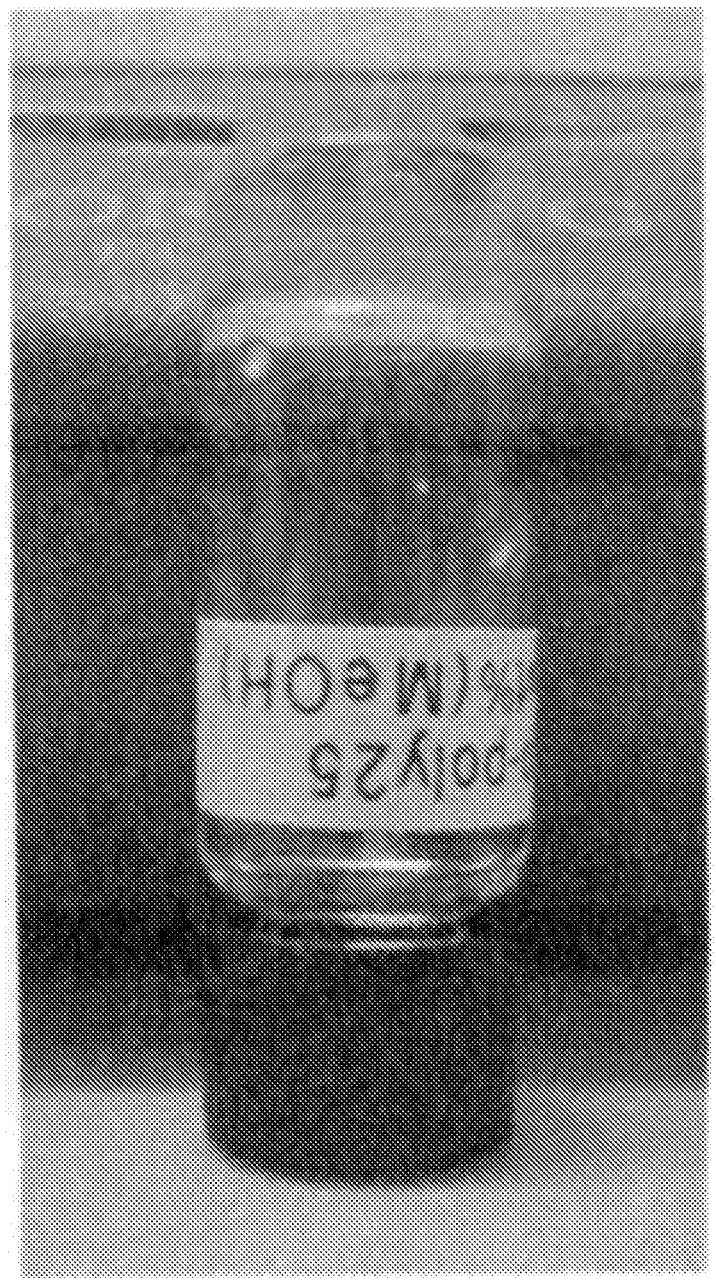
FIG. 2 is a photograph of a methanol gel obtained in Example 50.

The ionic organic compound of the formula (11), which was obtained in the foregoing Example 6, was charged together with methanol in a sample bottle having an internal volume of 10 mL such that its concentration was g/L and then dissolved under heating, whereby a transparent solution was obtained. When this solution was allowed to stand at room temperature, a gel was obtained under all of conditions. In this methanol gel, as seen in a photograph of FIG. 2, even when the sample bottle was inverted, the contents did not fall.

Similarly, by using the compounds of the formulae (13), (15) and (70), which were obtained in the foregoing Examples, respectively, similar methanol gels were obtained (the concentration range is from about 30 to 50 g/L).

Example 53

Figure 3:
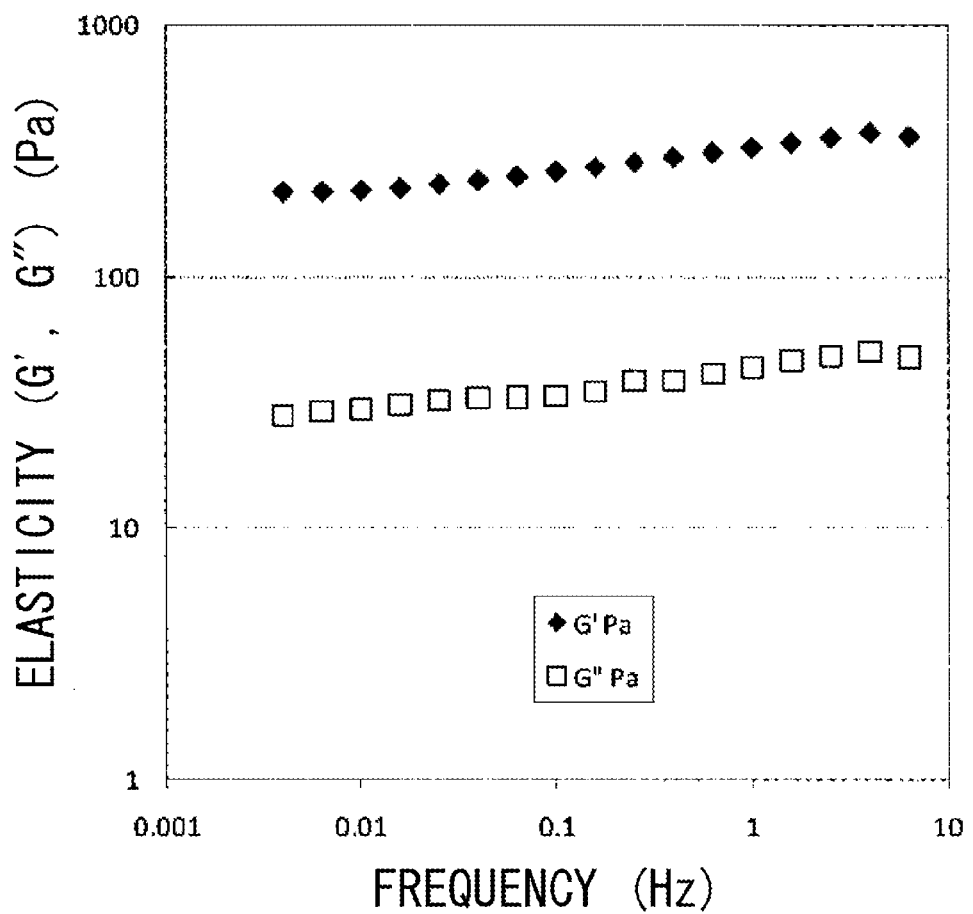
FIG. 3 is a graph showing the results obtained by measuring dynamic viscoelasticity of a hydrogel in Example 51.

Results obtained by measuring viscoelasticity using the hydrogel of the ionic organic compound of the formula (23), which was obtained in Example 12, in a concentration of 30 g/L by ARES-RFS (TA Instruments) are shown in FIG. 3. FIG. 3 is a graph in the case of taking a storage elastic modulus (G') and a loss elastic modulus (G'') at a strain of 1% on the ordinate and a frequency on the abscissa. On review of this graph, the frequency dependency is not substantially observed in the storage elastic modulus (G') and loss elastic modulus (G"), and G' is always larger than G", so that it has become also rheologically clear that this gel exhibits pseudo-solid properties.

Example 54

Figure 4A:
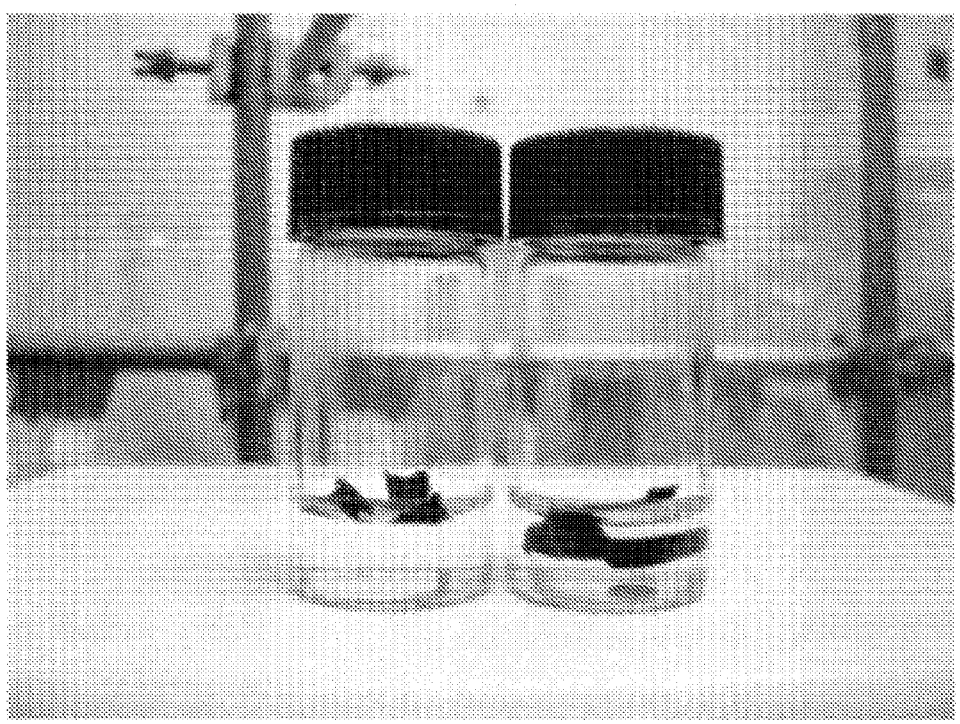
FIG. 4 is a view regarding the preparation of a carbon nanotube dispersion solution in Example 54, in which (a) shows the state before ultrasonic irradiation, and (b) shows the state after ultrasonic irradiation (in both of a and b, the left shows the case of using (7), and the right shows the case of using (3)).
Figure 4B:
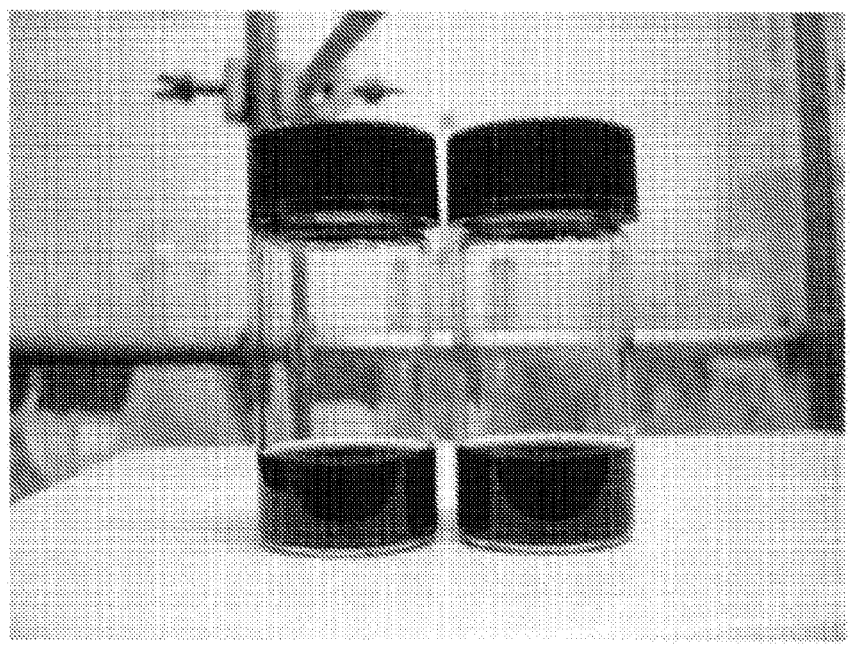

Preparation of Carbon Nanotube Dispersion Solution Using an Ionic Organic Compound Each of the ionic organic compound (3) obtained in Example 1 and the compound (7) obtained in Example 4 (90 mg each) was mixed with pure water (3 mL) after a deionization treatment in a sample tube and then heated to obtain a uniform solution. Each of the solutions was mixed with a multilayered carbon nanotube (1 mg) which had been prepared by an arc discharge method, and the mixture was irradiated with ultrasonic waves for 30 minutes using an ultrasonic irradiation apparatus for cleaning (130 W, 35 kHz), whereby a black carbon nanotube uniform aqueous solution was obtained, and a precipitate was not formed. The results are shown in FIG. 4, in which (a) shows the state before the ultrasonic irradiation, and (b) shows the state after the ultrasonic irradiation (the left shows the case of using (7), and the right shows the case of using (3)).

Similarly, carbon nanotube uniform dispersion solutions could be prepared using the compounds (4), (11), (13), (15), (25), (34), (38), (40), (42) and (70), respectively. A concentration range of the ionic organic compound is from about 1 g to 20/, and suitably about 10 g/L. A content of the carbon nanotube capable of being still dispersed was from 1 to 3 g/L.

Furthermore, in the case of using methanol as the solvent in place of water, similarly, carbon nanotube uniform dispersion methanol solutions could be prepared using the compounds (3), (11), (13), (28), (42) and (70), respectively. A concentration range of the ionic organic compound is from about 1 g to 20 g per liter, and suitably about 10 g/L. A content of the carbon nanotube capable of being still dispersed was from 1 to 20 g/L.

As described above, the ionic organic compound of the present invention has excellent properties as a hydrogelling agent, and a hydrogel is obtained by dissolving the subject compound in neutral water under heating and then allowing it to stand at room temperature. At the use of the ionic organic compound of the present invention as a hydrogelling agent, it is preferable to use the hydrogelling agent in an amount of from about 20 to 100 g/L, especially from about 20 to 50 g/L relative to water or an acidic aqueous solution that is objective to the gelation.

Also, similarly, the ionic organic compound of the present invention has excellent properties as a methanol gelling agent, and a methanol gel is obtained by dissolving the subject compound in methanol under heating and then allowing it to stand at room temperature. At the use of the ionic organic compound of the present invention as a methanol gelling agent, it is preferable to use the hydrogelling agent in an amount of from about 10 to 100 g/L, especially from about 20 to 50 g/L relative to methanol that is objective to the gelation.

Also, similarly, the ionic organic compound of the present invention has excellent properties as a carbon nanotube dispersant, and a carbon nanotube dispersion aqueous solution or a methanol solution is obtained by dissolving the subject compound in water or methanol under heating and adding the carbon nanotube, followed by an ultrasonic treatment. At the use of the ionic organic compound of the present invention as a carbon nanotube dispersion, it is preferable to use the dispersant in an amount of from about 1 to 100 g/L, especially about 10 g/L relative to water or methanol. Also, it is desirable to use the carbon nanotube in an amount of from about 1 to 20 g/L.

The invention claimed is:

1. An ionic organic compound represented by the following general formula (1):

[Ka 1]

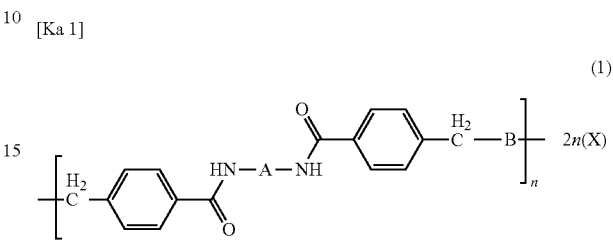

(1)

wherein
A represents a linking site having one or more optionally substituted aromatic rings; B represents a cationic functional group having a quaternized nitrogen atom, which is selected from N,N,N',N'-tetramethylalkylenediamines which may have a substituent having from 1 to 6 carbon atoms between nitrogen atoms; X represents a monovalent anion; and n represents an integer of from 1 to 800.

2. A production method of the ionic organic compound according to claim 1, comprising allowing (A) an optionally substituted aromatic diamide compound having a 4-(chloromethyl)benzamide group at both ends thereof and (B) a compound selected from N,N,N',N'-tetramethylalkylenediamines which may have a substituent having from 1 to 6 carbon atoms between nitrogen atoms to perform an addition reaction.

3. The production method according to claim 2, wherein the addition reaction is performed in dimethylformamide at from 50 to 80° C.

4. The production method of the ionic compound according to claim 2 or 3, further comprising substituting an anion of the obtained ionic compound with other anion by an anion interchange reaction.

5. A hydrogelling agent comprising the ionic organic compound according to claim 1.

6. A hydrogel containing the hydrogelling agent according to claim 5.

7. A methanol gelling agent comprising the ionic organic compound according to claim 1.

8. A methanol gel containing the methanol gelling agent according to claim 7.

9. A methanol gel containing a methanol gelling agent comprising an ionic organic compound represented by the following general formula (1):

[Ka 1]

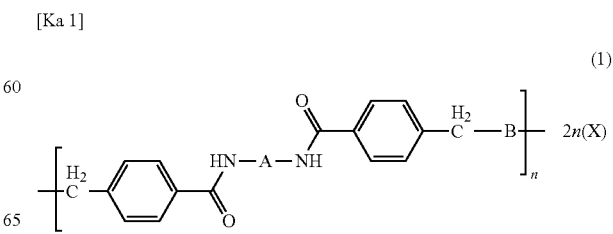

(1)

wherein
A represents a linking site having one or more optionally substituted aromatic rings or a linking site composed of a cyclohexane ring; B represents a cationic functional group having a quaternized nitrogen atom, which is selected from N,N,N',N'-tetramethylalkylenediamines which may have a substituent having from 1 to 6 carbon atoms between nitrogen atoms; X represents a monovalent anion; and n represents an integer of from 1 to 800.

10. An ionic organic compound represented by the following general formula (1):

[Ka 1]

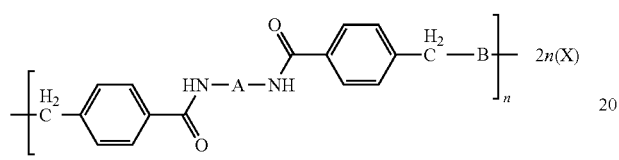

(1)

wherein
A represents a linking site composed of a cyclohexane ring; B represents a cationic functional group having a quaternized nitrogen atom, which is selected from N,N,N',N'-tetramethylalkylenediamines which may have a substituent having from 1 to 6 carbon atoms between nitrogen atoms; X represents a monovalent anion; and n represents an integer of from 1 to 800.

* * * * *